(12) United States Patent
Hasegawa et al.

(10) Patent No.: US 12,095,502 B2
(45) Date of Patent: Sep. 17, 2024

(54) COMMUNICATION DEVICE, COMMUNICATION CONTROLLING METHOD, NON-TRANSITORY COMPUTER-READABLE MEDIUM, AND OPTICAL COMMUNICATION SYSTEM

(71) Applicant: NEC Corporation, Tokyo (JP)

(72) Inventors: Yohei Hasegawa, Tokyo (JP); Hidemi Noguchi, Tokyo (JP); Shigeyuki Yanagimachi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 278 days.

(21) Appl. No.: 17/642,385

(22) PCT Filed: Sep. 20, 2019

(86) PCT No.: PCT/JP2019/037116
§ 371 (c)(1),
(2) Date: Mar. 11, 2022

(87) PCT Pub. No.: WO2021/053831
PCT Pub. Date: Mar. 25, 2021

(65) Prior Publication Data
US 2022/0329319 A1 Oct. 13, 2022

(51) Int. Cl.
*H04B 10/07* (2013.01)
*H04B 10/079* (2013.01)
(52) U.S. Cl.
CPC .............. *H04B 10/07953* (2013.01)
(58) Field of Classification Search
CPC .............. H04B 10/07953; H04B 10/07
See application file for complete search history.

(56) References Cited

U.S. PATENT DOCUMENTS 7,330,698 B1 * 2/2008 Bolt ............... H04W 16/10
455/63.1
7,684,696 B1 * 3/2010 Hadden ............ H04B 10/07
398/25
(Continued)

FOREIGN PATENT DOCUMENTS

JP 2011-077757 A 4/2011
JP 2012-222789 A 11/2012
(Continued)

OTHER PUBLICATIONS

JP Office Action for JP Application No. 2021-546170, mailed on Jul. 11, 2023 with English Translation.
(Continued)

*Primary Examiner* — Tanya T Motsinger
(74) *Attorney, Agent, or Firm* — Sughrue Mion, PLLC

(57) ABSTRACT

Provided is a communication device that can deliver an improvement in the communication capacity of communication infrastructure with the quality of communication taken into consideration. A communication device includes an acquiring unit configured to acquire quality information of a communication line extending from a first communication device to a second communication device and including an optical communication line, an estimating unit configured to estimate the quality of communication of the second communication device and determine the required quality of communication of the second communication device based on the quality information, and a controlling unit configured to perform control on communication channels in the optical communication line so that the quality of communication satisfies the required quality of communication.

16 Claims, 10 Drawing Sheets

(56) References Cited

U.S. PATENT DOCUMENTS

| | | | |
|---|---|---|---|
| 10,225,008 B1* | 3/2019 | Vassilieva | H04B 10/07953 |
| 10,917,170 B2* | 2/2021 | Rafique | H04J 14/0298 |
| 11,581,949 B1* | 2/2023 | Sanchez | H04B 10/58 |
| 11,889,391 B2* | 1/2024 | Shan | H04W 12/08 |
| 2002/0114394 A1* | 8/2002 | Ma | H04N 19/51 |
| | | | 375/240.24 |
| 2009/0060070 A1* | 3/2009 | Hayase | H04L 5/006 |
| | | | 375/296 |
| 2012/0230671 A1 | 9/2012 | Nakada et al. | |
| 2016/0036552 A1* | 2/2016 | Li | H04J 14/0257 |
| | | | 398/49 |
| 2017/0338890 A1 | 11/2017 | Takeshita et al. | |
| 2018/0205485 A1* | 7/2018 | Yuki | H04J 14/0275 |
| 2019/0140418 A1* | 5/2019 | Le Taillandier De Gabory | H01S 3/094061 |
| 2021/0075674 A1* | 3/2021 | Mansouri Rad | H04B 10/293 |

FOREIGN PATENT DOCUMENTS

| | | |
|---|---|---|
| JP | 2018-125787 A | 8/2018 |
| JP | 2019-114823 A | 7/2019 |
| WO | 2011/037245 A1 | 3/2011 |
| WO | 2016/079959 A1 | 5/2016 |

OTHER PUBLICATIONS

Yohei Hasegawa et al., Optical Communication Capacity and Quality to Maximize End-user TCP/IP Throughput, ICC 2020—2020 IEEE International Conference on Communications (ICC), EEE, Jun. 7, 2020, pp. 1-7, Japan.

Shoichiro Oda et al., Network Capacity Improvement by Quality of Transmission Estimator with Learning Process, 2017 European Conference on Optical Communication (ECOC), IEEE, Sep. 17, 2017, pp. 1-3, Japan.

Yohei Hasegawa et al., A Multi-User ACK Aggregation Method for Large-Scale Reliable LoRaWAN Service, ICC 2019—2019 IEEE International Conference on Communications(ICC), IEEE, May 20, 2019, pp. 1-7, Japan.

International Search Report for PCT Application No. PCT/JP2019/037116, mailed on Dec. 3, 2019.

* cited by examiner

COMMUNICATION DEVICE, COMMUNICATION CONTROLLING METHOD, NON-TRANSITORY COMPUTER-READABLE MEDIUM, AND OPTICAL COMMUNICATION SYSTEM

This application is a National Stage Entry of PCT/JP2019/037116 filed on Sep. 20, 2019, the contents of all of which are incorporated herein by reference, in their entirety.

TECHNICAL FIELD

The present disclosure relates to communication devices, communication controlling methods, non-transitory computer-readable media, and optical communication systems.

BACKGROUND ART

As disclosed in Patent Literature 1, for example, signal errors are extremely rare in optical communication systems that communicate via submarine cables as compared to in land-based communication systems, since a powerful error correction process is generally carried out in such optical communication systems. Specifically, the optical communication system disclosed in Patent Literature 1 can provide its end users with so-called error-free communication, where data can be transmitted and received therein at an extremely low error rate. Patent Literature 1 discloses a technique for improving the throughput in an optical communication system while ensuring error-free communication.

CITATION LIST

Patent Literature

Patent Literature 1: International Patent Publication No. WO2011/037245

SUMMARY OF INVENTION

Technical Problem

The optical communication system disclosed in Patent Literature 1, however, appends a number of error correcting codes to data to be transmitted or received thereby in order to provide error-free communication. Therefore, although the technique disclosed in Patent Literature 1 can improve the throughput, this technique fails to deliver an improvement in the communication capacity of communication infrastructure.

With regard to optical communication systems, communication service providers that manage communication equipment and communication lines (communication infrastructure) have increasingly diversified in recent years. Some communication service providers in the field of optical communication systems may be inclined to ensure the communication capacity of communication infrastructure by setting the acceptable quality of communication lower than the quality of communication in error-free communication. The diversification of communication service providers in the field of optical communication systems has made it necessary to take into consideration not only the quality of communication but also the communication capacity of communication infrastructure.

The present disclosure has been made in view of the above, one object of the present disclosure is to provide a communication device, a communication controlling method, a non-transitory computer-readable medium, and an optical communication system that each can deliver an improvement in the communication capacity of communication infrastructure with the quality of communication taken into consideration.

Solution to Problem

A communication device according to the present disclosure includes: acquiring means configured to acquire quality information of a communication line, the communication line extending from a first communication device to a second communication device and including an optical communication line; estimating means configured to estimate a quality of communication of the second communication device and determine a required quality of communication of the second communication device based on the quality information; and controlling means configured to perform control on communication channels in the optical communication line so that the quality of communication satisfies the required quality of communication.

A communication controlling method according to the present disclosure includes: acquiring quality information of a communication line, the communication line extending from a first communication device to a second communication device and including an optical communication line; estimating a quality of communication of the second communication device and determining a required quality of communication of the second communication device based on the quality information; and performing control on communication channels in the optical communication line so that the quality of communication satisfies the required quality of communication.

A non-transitory computer-readable medium according to the present disclosure stores a program that causes a computer to execute: acquiring quality information of a communication line, the communication line extending from a first communication device to a second communication device and including an optical communication line; estimating a quality of communication of the second communication device and determining a required quality of communication of the second communication device based on the quality information; and performing control on communication channels in the optical communication line so that the quality of communication satisfies the required quality of communication.

An optical communication system according to the present disclosure includes: a first optical transmitter device; a second optical transmitter device configured to communicate with the first optical transmitter device via an optical communication line; and a network monitoring device configured to communicate with the first optical transmitter device and the second optical transmitter device, in which the first optical transmitter device is configured to measure first quality information of a first communication line extending from a first communication device to the first optical transmitter device, the second optical transmitter device is configured to measure second quality information of the optical communication line and third quality information of a second communication line extending from the second optical transmitter device to a second communication device, and the network monitoring device is configured to acquire the first quality information from the first optical transmitter device and acquire the second quality information and the third quality information from the second optical transmitter device, estimate a quality of communication of the first communication device and determine a required quality of communication of the first communication device based on the first quality information, the second quality information, and the third quality information, and perform control on communication channels in the optical communication line via the first optical transmitter device so that the quality of communication satisfies the required quality of communication.

Advantageous Effects of Invention

The present disclosure can provide a communication device, a communication controlling method, a non-transitory computer-readable medium, and an optical communication system that each can deliver an improvement in the communication capacity of communication infrastructure with the quality of communication taken into consideration.

BRIEF DESCRIPTION OF THE DRAWINGS

FIG. 10 illustrates an example of a hardware configuration of a communication device and so on.

DESCRIPTION OF EMBODIMENTS

Figure 1:
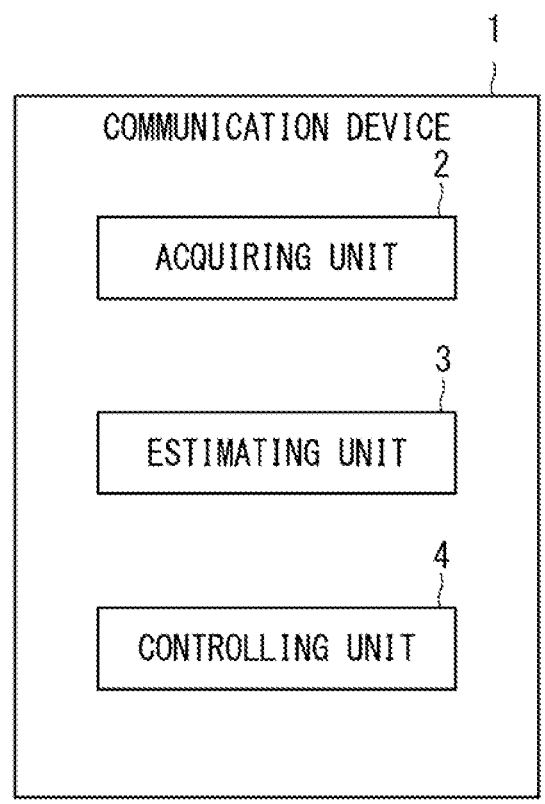
FIG. 1 is a block diagram illustrating an example of a configuration of a communication device according to an overview of some example embodiments.

Hereinafter, some example embodiments of the present disclosure will be described with reference to the drawings. In the following description and drawings, omissions and simplifications are made, as appropriate, to make the description clearer. In the drawings, identical elements are given identical reference characters, and their repetitive description will be omitted, as necessary.

OVERVIEW OF EXAMPLE EMBODIMENTS

An overview of some example embodiments will be given prior to the detailed description of the example embodiments. FIG. 1 is a block diagram illustrating an example of a configuration of a communication device 1 according to an overview of some example embodiments. The communication device 1 partly constitutes an optical communication system and may be, for example, an optical transmitter device or a network monitoring device that monitors and controls the optical communication system. The communication device 1 includes an acquiring unit 2, an estimating unit 3, and a controlling unit 4.

The acquiring unit 2 acquires quality information of a communication line extending from a first communication device to a second communication device and including an optical communication line. The first communication device and the second communication device may each be an end user terminal managed by an end user. Alternatively, the first communication device and the second communication device may each be a relay device provided between an end user terminal and an optical transmitter device.

The estimating unit 3 estimates the quality of communication of the second communication device and determines a required quality of communication of the second communication device based on the quality information acquired by the acquiring unit 2.

The controlling unit 4 performs control on communication channels in an optical communication line so that the estimated quality of communication satisfies the determined required quality of communication.

As described above, the communication device 1 estimates the quality of communication of the second communication device and determines the required quality of communication of the second communication device based on the quality information of the communication line extending from the first communication device to the second communication device. The communication device 1 performs control on the communication channels in the optical communication line so that the quality of communication satisfies the required quality of communication. The control that the communication device 1 performs on the communication channels can deliver an improvement in the communication capacity of the optical communication line. Accordingly, the communication device 1 according to the overview of the example embodiments can deliver an improvement in the communication capacity of communication infrastructure with the quality of communication taken into consideration.

Hereinafter, some example embodiments will be described in detail with reference to the drawings.

First Example Embodiment

Example of Configuration of Optical Communication System

Figure 2:
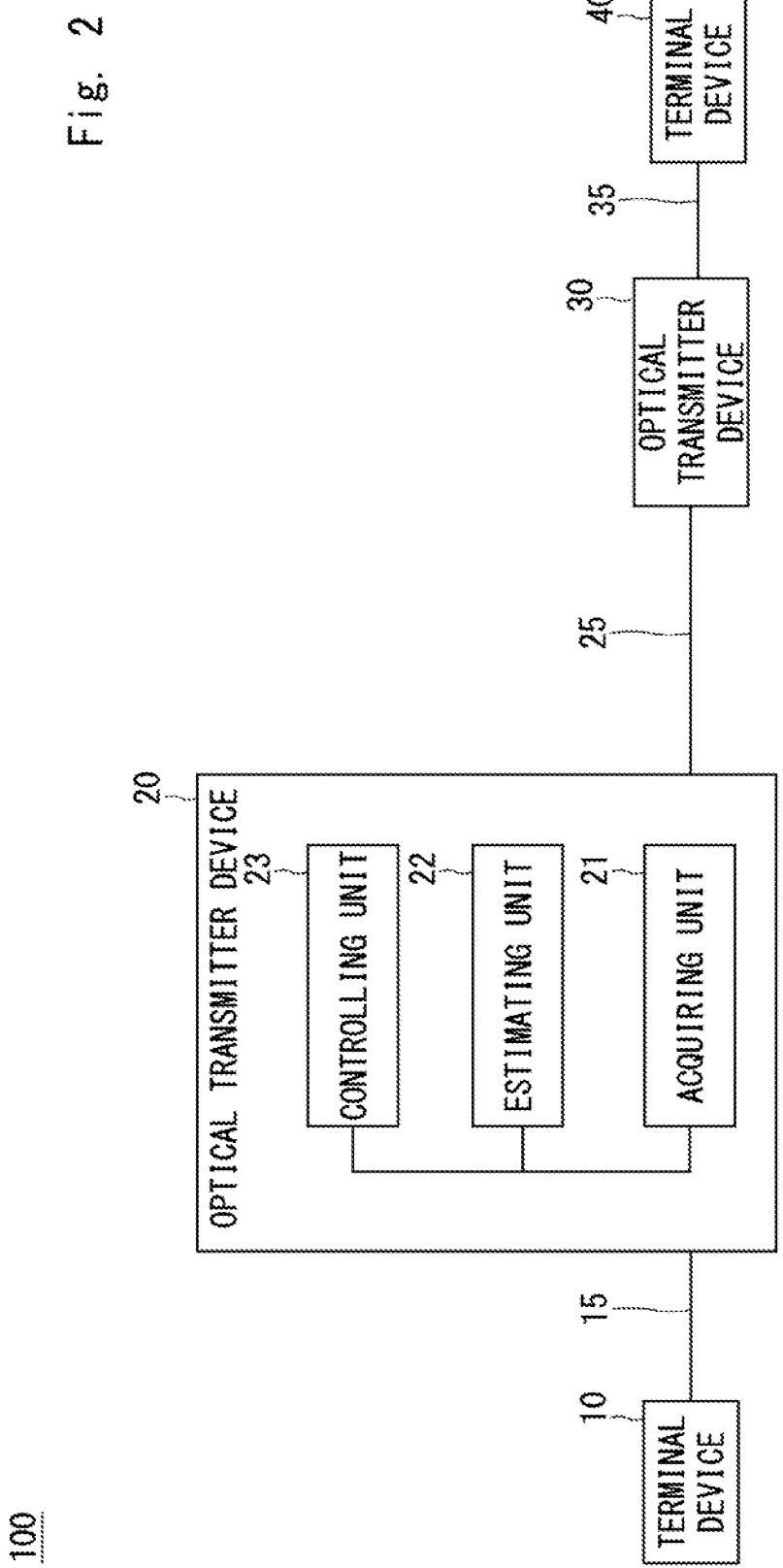
FIG. 2 illustrates an example of a configuration of an optical communication system according to a first example embodiment.

With reference to FIG. 2, an example of a configuration of an optical communication system 100 according to a first example embodiment will be described. FIG. 2 illustrates an example of a configuration of an optical communication system according to the first example embodiment. The optical communication system 100 includes terminal devices 10 and 40 and optical transmitter devices 20 and 30.

The terminal devices 10 and 40 are each, for example, a communication device provided on land. The terminal devices 10 and 40 may each be, for example but not limited to, an end user terminal managed by an end user or a relay device provided between an end user terminal and the optical transmitter device 20. In the description given hereinafter, the terminal devices 10 and 40 are each an end user terminal.

The terminal device 10 is connected to the optical transmitter device 20 via a circuit 15 and communicates with the optical transmitter device 20 via the circuit 15. The circuit 15 is, for example, an access circuit. The segment between the terminal device 10 and the optical transmitter device 20 may be referred to as a first circuit segment. The circuit 15 may be referred to as a communication line between the terminal device 10 and the optical transmitter device 20.

The terminal device 40 is connected to the optical transmitter device 30 via a circuit 35 and communicates with the optical transmitter device 30 via the circuit 35. The circuit 35 is, for example, an access circuit. The segment between the optical transmitter device 30 and the terminal device 40 may be referred to as a second circuit segment. The circuit 35 may be referred to as a communication line between the terminal device 40 and the optical transmitter device 30.

The optical transmitter devices 20 and 30 are communication devices that are connected to each other via an optical communication line 25 and communicate with each other via the optical communication line 25. The optical communication line 25 is a submarine cable constituted, for example, by optical fibers. The optical transmitter devices 20 and 30 each convert an optical signal received or to be transmitted via the optical communication line 25 into an electric signal to be transmitted via the circuit 15 or 35. Moreover, the optical transmitter devices 20 and 30 each convert an electric signal received or to be transmitted via the circuit 15 or 35 to an optical signal to be transmitted via the optical communication line 25.

The optical transmitter devices 20 and 30 each support a wavelength division multiplexing (WDM) scheme and transmit data transmitted and received via the optical communication line 25 to the opposing optical transmitter device via a plurality of communication channels in a plurality of wavelength bands. Each communication channel may be referred to as an optical spectrum. To rephrase, the optical transmitter devices 20 and 30 each transmit and receive data to and from the opposing optical transmitter device by use of the optical spectra corresponding to the respective communication channels.

The optical transmitter device 20 corresponds to the communication device 1 according to the overview of the example embodiments. The optical transmitter device 20 transmits data received from the terminal device 10 to the terminal device 40 via the optical communication line 25 and the optical transmitter device 30. The optical transmitter device 20 receives an ACK signal (ACK or NACK) from the terminal device 40 and transmits this ACK signal (ACK or NACK) to the terminal device 10.

Moreover, the optical transmitter device 20 receives data to be transmitted to the terminal device 10 and transmits this data to the terminal device 10. The optical transmitter device 20 transmits an ACK signal (ACK or NACK) received from the terminal device 10 to the terminal device 40 via the optical communication line 25 and the optical transmitter device 30.

The optical transmitter device 20 acquires quality information of the communication line extending from the terminal device 10 to the terminal device 40. The optical transmitter device 20 acquires the quality information of the first circuit segment by measuring this quality information. The optical transmitter device 20 acquires the quality information of the optical communication line 25 and the quality information of the second circuit segment from the optical transmitter device 30.

The optical transmitter device 20 estimates the quality of communication of the terminal device 40 and determines the required quality of communication, which indicates the quality of communication required of the terminal device 40, based on the quality information of the first circuit segment, the quality information of the optical communication line 25, and the quality information of the second circuit segment. The quality of communication and the required quality of communication may each be indicated, for example, by the throughput or the frame error rate (FER) that indicates the error rate held after error correction. The optical transmitter device 20 performs control on the communication channels in the optical communication line 25 so that the estimated quality of communication satisfies the required quality of communication. In the description given hereinafter, the quality of communication and the required quality of communication are each indicated by the throughput.

The quality information of the first circuit segment, the quality information of the optical communication line 25, and the quality information of the second circuit segment each include the round-trip time (RTT) indicating the delay time and the FER indicating the error rate held after error correction. The quality information of the optical communication line 25 includes the out-of-frame (OOF) indicating the detection failure rate of detecting data (frame) transmitted and received via the optical communication line 25 and the bit error rate (BER) indicating the error rate held before error correction of this data.

The quality information of the optical communication line 25 further includes optical spectrum information of the communication channels in the optical communication line 25. The optical spectrum information includes the intensity of received light in the communication channels in the optical communication line 25, the center frequency of each communication channel, the bandwidth, the guard band, the WDM channel width, the signal-to-noise ratio, and the Q value indicating the optical quality value. The signal-to-noise ratio may be, for example, an optical signal-to-noise ratio (OSNR). In the description given hereinafter, the signal-to-noise ratio is the OSNR.

Figure 3:
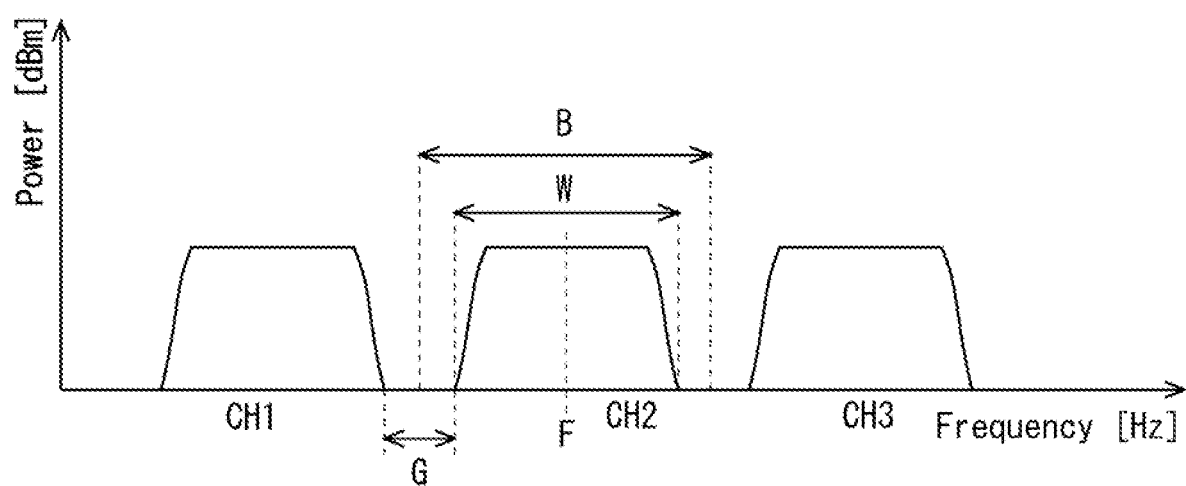
FIG. 3 is a schematic diagram illustrating communication channels in an optical communication line.

Now, with reference to FIG. 3, the optical spectrum information will be described. FIG. 3 is a schematic diagram illustrating communication channels in the optical communication line 25, and this schematic diagram is for describing the optical spectrum information. Specifically, FIG. 3 shows a relationship between the intensity of received light, the center frequency of one communication channel, the bandwidth, the guard band width, and the WDM channel width. FIG. 3 omits the Q value. The center frequency is the center frequency of each communication channel. The bandwidth is the frequency bandwidth of each communication channel. The guard band width is an unused frequency width provided between adjacent communication channels so as to suppress any influence on these communication channels. The WDM channel width is the frequency width of a WDM channel and is the width of frequencies falling between the centers of the guard band widths provided between the respective adjacent communication channels.

Referring back to FIG. 2, the optical transmitter device 30 transmits data received from the terminal device 40 to the terminal device 10 via the optical communication line 25 and the optical transmitter device 20. The optical transmitter device 30 receives an ACK signal (ACK or NACK) from the terminal device 10 and transmits this ACK signal (ACK or NACK) to the terminal device 40.

Moreover, the optical transmitter device 30 receives data to be transmitted to the terminal device 40 and transmits this data to the terminal device 40. The optical transmitter device 30 transmits an ACK signal (ACK or NACK) received from the terminal device 40 to the terminal device 10 via the optical communication line 25 and the optical transmitter device 20.

The optical transmitter device 30 determines the RTT in the second circuit segment by measuring the RTT. The optical transmitter device 30 determines, as the RTT, the time from a transmission start time at which data to be transmitted to the terminal device 40 starts being transmitted to a reception start time at which an ACK signal corresponding to this data is received from the terminal device 40.

In this example, the optical transmitter device 30 may hold position information corresponding to an internet protocol (IP) address. Thus, the optical transmitter device 30 may identify the position of the terminal device 40 based on the IP address of the data transmitted from the terminal device 10 to the terminal device 40 and determine the RTT by calculating the distance between the optical transmitter device 30 and the terminal device 40.

The optical transmitter device 30 acquires the FER in the second circuit segment based on the communication service provider that provides the circuit 35. The optical transmitter device 30 acquires the IP address of the data addressed to the terminal device 40 based on the data transmitted from the terminal device 10 to the terminal device 40. The optical transmitter device 30 identifies the communication service provider that provides the circuit 35 based on the acquired IP address and determines the FER in the second circuit segment based on the communication service provider.

Supposing the service of the communication service provider that provides the circuit 35, the optical transmitter device 30 may set, in advance, the FER expected for the circuit 35 and determine the FER in the second circuit segment based on the FER set in advance based on the identified communication service provider. Alternatively, the optical transmitter device 30 may set, in advance, the FER expected for the circuit 35 based on past statistical values. In this example, the optical transmitter device 30 may determine the FER in the second circuit segment based on the combination of the circuit type of the circuit 35 and the communication service provider.

The optical transmitter device 30 measures the RTT in the optical communication line 25. The optical transmitter device 30 may measure the RTT in the optical communication line 25 by use of a measurement signal, such as a ping, sent to the optical transmitter device 20. Alternatively, the optical transmitter device 30 may measure the RTT in the optical communication line 25 by use of a monitoring signal for alive monitoring of the optical transmitter device 20.

The optical transmitter device 30 monitors data transmitted and received via the optical communication line 25 and measures the FER of this data.

The optical transmitter device 30 measures the OOF and the BER in the optical communication line 25.

The optical transmitter device 30 includes, for example, an optical spectrum measuring device, such as an optical channel monitor (OCM) or an optical spectrum analyzer, and monitors the optical power (the intensity) in each communication channel in the optical communication line 25. The optical transmitter device 30 measures, by use of the optical spectrum measuring device, the intensity of received light in the communication channels, the center frequency, the bandwidth, the guard band width, the WDM channel width, and the OSNR.

The optical transmitter device 30 calculates the Q value based on the signal values (0 and 1) of signals transmitted and received via the optical communication line 25. The optical transmitter device 30 acquires the probability distribution and the demodulated signal level of each of the signal values (0 and 1) of the signals. The optical transmitter device 30 calculates the Q value based on the dispersion of the probability distribution of the signal value of 1, the dispersion of the probability distribution of the signal value of 0, and the difference values between the demodulated signal levels.

Example of Configuration of Optical Transmitter Device

Next, an example of a configuration of the optical transmitter device 20 will be described. The optical transmitter device 20 includes an acquiring unit 21, an estimating unit 22, and a controlling unit 23.

The acquiring unit 21 corresponds to the acquiring unit 2 according to the overview of the example embodiments. The acquiring unit 21 is configured to be capable of communicating with the terminal device 10 and the optical transmitter device 30 and also functions as a communication unit. The acquiring unit 21 acquires quality information of the communication line extending from the terminal device 10 to the terminal device 40.

Specifically, the acquiring unit 21 acquires the RTT in the first circuit segment by measuring the RTT, determines the FER in the first circuit segment, and acquires the determined FER as the FER in the first circuit segment.

The acquiring unit 21 measures a transmission start time at which data starts being transmitted to the terminal device 10 and a reception start time at which an ACK signal corresponding to this data is received from the terminal device 10. The acquiring unit 21 acquires the time between the transmission start time and the reception start time as the RTT.

In this example, the acquiring unit 21 may hold position information corresponding to an IP address. Thus, the acquiring unit 21 may identify the position of the terminal device 10 based on the IP address of data transmitted from the terminal device 40 to the terminal device 10 and determine the RTT by calculating the distance between the optical transmitter device 20 and the terminal device 10.

The acquiring unit 21 acquires the FER in the first circuit segment based on the communication service provider that provides the circuit 15. The acquiring unit 21 acquires the IP address of data addressed to the terminal device 10 based on the data transmitted from the terminal device 40 to the terminal device 10. The acquiring unit 21 identifies the communication service provider that provides the circuit 15 based on the acquired IP address and determines the FER in the first circuit segment based on the identified communication service provider.

Supposing the service of the communication service provider that provides the circuit 15, the acquiring unit 21 may set, in advance, the FER expected for the circuit 15 and determine the FER in the first circuit segment based on the FER set in advance based on the identified communication service provider. Alternatively, the acquiring unit 21 may set, in advance, the FER expected for the circuit 15 based on past statistical values. In this example, the acquiring unit 21 may determine the FER in the first circuit segment based on the combination of the circuit type of the circuit 15 and the communication service provider.

The acquiring unit 21 receives the RTT and the FER in the second circuit segment from the optical transmitter device 30 and thus acquires the RTT and the FER in the second circuit segment. In this example, the acquiring unit 21 may determine the RTT and the FER in the second circuit segment without acquiring the RTT and the FER in the second circuit segment from the optical transmitter device 30. The acquiring unit 21 may hold position information corresponding to an IP address. Thus, the acquiring unit 21 may identify the position of the terminal device 40 based on the IP address of data transmitted from the terminal device 10 to the terminal device 40 and determine the RTT by calculating the distance between the optical transmitter device 30 and the terminal device 40.

Alternatively, the acquiring unit 21 may acquire the IP address of data addressed to the terminal device 40 based on the data transmitted from the terminal device 10 to the terminal device 40, identify the communication service provider that provides the circuit 35 based on the acquired IP address, and determine the FER in the second circuit segment based on the communication service provider.

Supposing the service of the communication service provider that provides the circuit 35, the acquiring unit 21 may set, in advance, the FER expected for the circuit 35 and determine the FER in the first circuit segment based on the FER set in advance based on the identified communication service provider. Alternatively, the acquiring unit 21 may set, in advance, the FER expected for the circuit 35 based on past statistical values. In this example, the acquiring unit 21 may determine the FER in the second circuit segment based on the combination of the circuit type of the circuit 35 and the communication service provider.

The acquiring unit 21 receives the RTT and the FER in the optical communication line 25 from the optical transmitter device 30 and thus acquires the RTT and the FER in the optical communication line 25. In this example, the acquiring unit 21 may determine the RTT in the optical communication line 25 without acquiring the RTT in the optical communication line 25 from the optical transmitter device 30. The acquiring unit 21 may measure the RTT in the optical communication line 25 by use of a measurement signal, such as a ping, sent to the optical transmitter device 30. Alternatively, the acquiring unit 21 may measure the RTT in the optical communication line 25 by use of a monitoring signal for alive monitoring of the optical transmitter device 30.

The acquiring unit 21 receives the OOF of data (frame) transmitted and received via the optical communication line 25 and the BER of this data from the optical transmitter device 30 and thus acquires the OOF and the BER in the optical communication line 25.

The acquiring unit 21 receives optical spectrum information from the optical transmitter device 30 and thus acquires the optical spectrum information. Specifically, the acquiring unit 21 acquires, from the optical transmitter device 30, the intensity of received light in the communication channels in the optical communication line 25, the center frequency, the bandwidth, the guard band width, the WDM channel width, the OSNR, and the Q value. In this example, the acquiring unit 21 may acquire the intensity of received light in the communication channels in the optical communication line 25, the center frequency, the bandwidth, the guard band width, the WDM channel width, and the OSNR by measuring these pieces of information, without receiving these pieces of information from the optical transmitter device 30. The acquiring unit 21 may include, for example, an optical spectrum measuring device, such as an optical channel monitor (OCM) or an optical spectrum analyzer, and acquire the optical spectrum information by monitoring the optical power (the intensity) of an optical signal in each communication channel in the optical communication line 25. Specifically, by use of the optical spectrum measuring device, the acquiring unit 21 may measure and acquire the intensity of received light in the communication channels in the optical communication line 25, the center frequency, the bandwidth, the guard band width, the WDM channel width, and the OSNR.

The estimating unit 22 corresponds to the estimating unit 3 according to the overview of the example embodiments. The estimating unit 22 estimates the throughput of the terminal device 40. Moreover, the estimating unit 22 determines a required throughput indicating the throughput required of the terminal device 40.

The estimating unit 22 estimates the throughput of the terminal device 40 and determines the required throughput of the terminal device 40 by use of the RTTs and the FERs in the first circuit segment, the optical communication line 25, and the second circuit segment that the acquiring unit 21 has acquired and an estimation model for estimating the throughput.

Now, the estimation model for estimating the throughput will be described. The estimation model is a model formulated by use of RTTs and FERs and can be expressed as in the expression (1).

[Math. 1]

$$b = \frac{D}{rp} \quad (1)$$

In the above, b represents the throughput, r represents the RTT, p represents the FER, and D is a constant. The constant D is, for example, 0.866 or may take any value that can be adjusted, as appropriate.

The estimation model expressed by the expression (1) is used in the description given below. Alternatively, the following expression (2) or (3) can also be used as an estimation model. Furthermore, an expression that is a modification of the expression (2) or (3) may also be used as an estimation model.

[Math. 2]

$$b = \frac{D}{r}\log\left(\frac{1}{p}\right) \quad (2)$$

$$b = \frac{D}{r\sqrt{p}} \quad (3)$$

Herein, the RTT in the first circuit segment is designated by $r_s$, the FER in the first circuit segment is designated by $p_s$, the RTT in the second circuit segment is designated by $r_r$, the FER in the second circuit segment is designated by $p_r$, the RTT in the optical communication line 25 is designated by $r_{tp}$, and the FER in the optical communication line 25 is designated by $p_{tp}$. In addition, the RTT from the terminal device 10 to the terminal device 40 is designated by $r_{e2e}$, the FER from the terminal device 10 to the terminal device 40 is designated by $p_{est}$, and the throughput of the terminal device 40 is designated by $b_{est}$.

The RTT $r_{e2e}$ can be expressed by $r_{e2e} = r_{tp} + r_s + r_r$. The FER $p_{est}$ can be expressed by $p_{est} = 1 - (1-p_{tp})(1-p_s)(1-p_r)$. Therefore, $b_{est}$ can be expressed as in the following expression (4) when $r_{e2e}$ and $p_{est}$ are plugged into the expression (1). The estimating unit 22 estimates the throughput by use of the expression (4) and the RTTs and the FERs in the first circuit segment, the optical communication line 25, and the second circuit segment.

[Math. 3]

$$b_{est} = b(r_{e2e}, p_{est}) = \frac{D}{(r_{tp} + r_r + r_s)(1 - (1 - p_{tp})(1 - p_s)(1 - p_r))} \quad (4)$$

The required throughput is determined based on the throughput in an error-free communication state. The required throughput is determined with the FER in the optical communication line 25 regarded as being zero. In this example, the required throughput may be determined by plugging the FER in an error-free communication state into $p_{tp}$ in the expression (4) above.

The required throughput can be expressed as in the following expression (5) where the required throughput is designated by $b_{target}$ and the FER from the terminal device 10 to the terminal device 40 in an error-free communication state is designated by $p_{e2e}$.

[Math. 4]

$$b_{target} = \alpha \times b(r_{e2e}, p_{e2e}) = \alpha \times \frac{D}{(r_{tp} + r_r + r_s)(1 - (1 - p_s)(1 - p_r))} \quad (5)$$

In the above, α is a value no greater than 1 and is a coefficient that the communication service provider managing the optical communication line 25 determines based on the acceptable throughput.

The estimating unit 22 determines the required throughput by use of the RTTs in the first circuit segment, the optical communication line 25, and the second circuit segment, the FERs in the first circuit segment and the second circuit segment, and the expression (5).

In this example, the communication capacity of the optical communication line 25 is related to the total throughput of data transmitted and received via the optical communication line 25. This communication capacity is in proportion to the total throughput until the total throughput reaches a specific value but is expected to be out of proportion to the total throughput once the total throughput exceeds the specific value. Therefore, once the total throughput exceeds the specific value, the communication capacity of the optical communication line 25 can no longer be expected to improve effectively even if the total throughput is increased. The total throughput is related to the throughput of each user and the number of users. The total throughput can be calculated, for example, by multiplying the throughput of each user by the number of users. Accordingly, the communication capacity can be improved by adjusting the required throughput, as appropriate. In other words, the communication capacity can be improved effectively by adjusting, as appropriate, a in the expression (5) for calculating the required throughput or the constant D in the expressions (4) and (5).

The controlling unit 23 corresponds to the controlling unit 4 according to the overview of the example embodiments. The controlling unit 23 performs control on the communication channels in the optical communication line 25 so that the estimated throughput $b_{est}$ satisfies the required throughput $b_{target}$. Specifically, the controlling unit 23 performs control on the communication channels in the optical communication line 25 so that $b_{est} > b_{target}$ is satisfied. Upon determining the content of the control to be performed on the communication channels in the optical communication line 25, the controlling unit 23 informs the optical transmitter device 30 of the determined content of the control and makes the optical transmitter device 30 capable of receiving an optical signal transmitted from the optical transmitter device 20.

Herein, when $b_{est} > b_{target}$ is transformed by use of the expressions (4) and (5), $b_{est} > b_{target}$ can be expressed as in the following expression (6).

[Math. 5]

$$b_{est} > b_{target} \quad (6)$$

$$\frac{D}{r_{e2e} p_{est}} > \alpha \times \frac{D}{r_{e2e} p_{e2e}}$$

$$p_{tp} > 1 - \frac{1 - \alpha(1 - (1 - p_s)(1 - p_r))}{\alpha(1 - p_s)(1 - p_r)}$$

The expression (6) above is an expression obtained by transforming the expressions (4) and (5) from the standpoint of the FERs, and the controlling unit 23 performs control on the communication channels in the optical communication line 25 so that the FER $p_{tp}$ in the optical communication line 25 satisfies the expression (6) above.

The controlling unit 23 executes at least one of communication capacity control or forward error correction (FEC) control so that $b_{est} > b_{target}$ is satisfied. The communication capacity control is control of changing at least one of the channel configuration or the modulation scheme of the communication channels, and this control can increase or reduce the communication capacity of the optical communication line 25. Meanwhile, the FEC control is control of changing the error correction process to be applied to the communication channels. In this example, the communication capacity control causes the state of each optical spectrum in the optical communication line 25 to change, and therefore, the communication capacity control may be referred to also as optical spectrum control.

The controlling unit 23 performs at least one of the communication capacity control or the FEC control if the estimated throughput fails to satisfy a predetermined condition that is based on the required throughput. The predetermined condition is that the throughput $b_{est}$ falls below the required throughput $b_{target}$ if the communication capacity control and the FEC control are executed in an error-free communication state to lower the throughput $b_{est}$ by raising the FER $p_{tp}$ in the optical communication line 25. In this example, if the controlling unit 23 performs control to lower the throughput $b_{est}$ from an error-free communication state, the predetermined condition may be that the throughput $b_{est}$ is within a predetermined range defined by the required throughput $b_{target}$ and a value obtained by adding a margin to $b_{target}$. Alternatively, if the controlling unit 23 executes the communication capacity control and the FEC control to raise $b_{est}$ by lowering the FER $p_{tp}$ in the optical communication line 25, the predetermined condition may be that $b_{est}$ exceeds $b_{target}$.

In the description given hereinafter, the controlling unit 23 executes the communication capacity control and the FEC control from an error-free communication state to lower the throughput $b_{est}$. In other words, the controlling unit 23 executes at least one of the communication capacity control or the FEC control when the throughput $b_{est}$ fails to fall below the required throughput $b_{target}$.

When the throughput $b_{est}$ falls below the required throughput $b_{target}$, the controlling unit 23 makes a change to achieve an optimal state in which the throughput $b_{est}$ satisfies the required throughput $b_{target}$ and terminates the process.

The optimal state is a state in which the throughput $b_{est}$ is at the lowest throughput that exceeds the required throughput $b_{target}$. In other words, the controlling unit 23 executes control of reversing the control performed immediately before the throughput $b_{est}$ has fallen below the required throughput $b_{target}$ and terminates the process.

When the throughput $b_{est}$ fails to fall below the required throughput $b_{target}$, the controlling unit 23 executes the communication capacity control in accordance with the Q value and the OOF and executes the FEC control if the Q value and the OOF are each within a predetermined range.

First, the communication capacity control will be described. When the throughput $b_{est}$ fails to fall below the required throughput $b_{target}$, the controlling unit 23 executes the communication capacity control in accordance with the Q value and the OOF. When the Q value is good and the OOF is low, the controlling unit 23 performs control of increasing the communication capacity. When the Q value is not good but the OOF is low, the controlling unit 23 performs control of increasing the communication capacity. When the Q value is not good and the OOF is high, the controlling unit 23 performs control of reducing the communication capacity.

Specifically, when the Q value is no lower than a Q value threshold, which is a threshold for the Q value, and when the OOF is lower than an OOF threshold, which is a threshold for the OOF, the controlling unit 23 performs control of increasing the communication capacity. When the Q value is lower than the Q value threshold and when the OOF is lower than the OOF threshold, the controlling unit 23 performs control of increasing the communication capacity. When the Q value is lower than the Q value threshold and when the OOF is no lower than the OOF threshold, the controlling unit 23 performs control of reducing the communication capacity.

As the control of increasing the communication capacity, the controlling unit 23 executes at least one of control of increasing the number of communication channels in the optical communication line 25, control of narrowing the guard band width between the communication channels, or control of raising the multi-value level of the modulation scheme. As the control of reducing the communication capacity, the controlling unit 23 executes at least one of control of reducing the number of communication channels in the optical communication line 25, control of broadening the guard band width between the communication channels, or control of lowering the multi-value level of the modulation scheme. The controlling unit 23 increases or reduces the number of communication channels by changing the center frequency and the bandwidth of each communication channel in the optical communication line 25.

Figure 4:
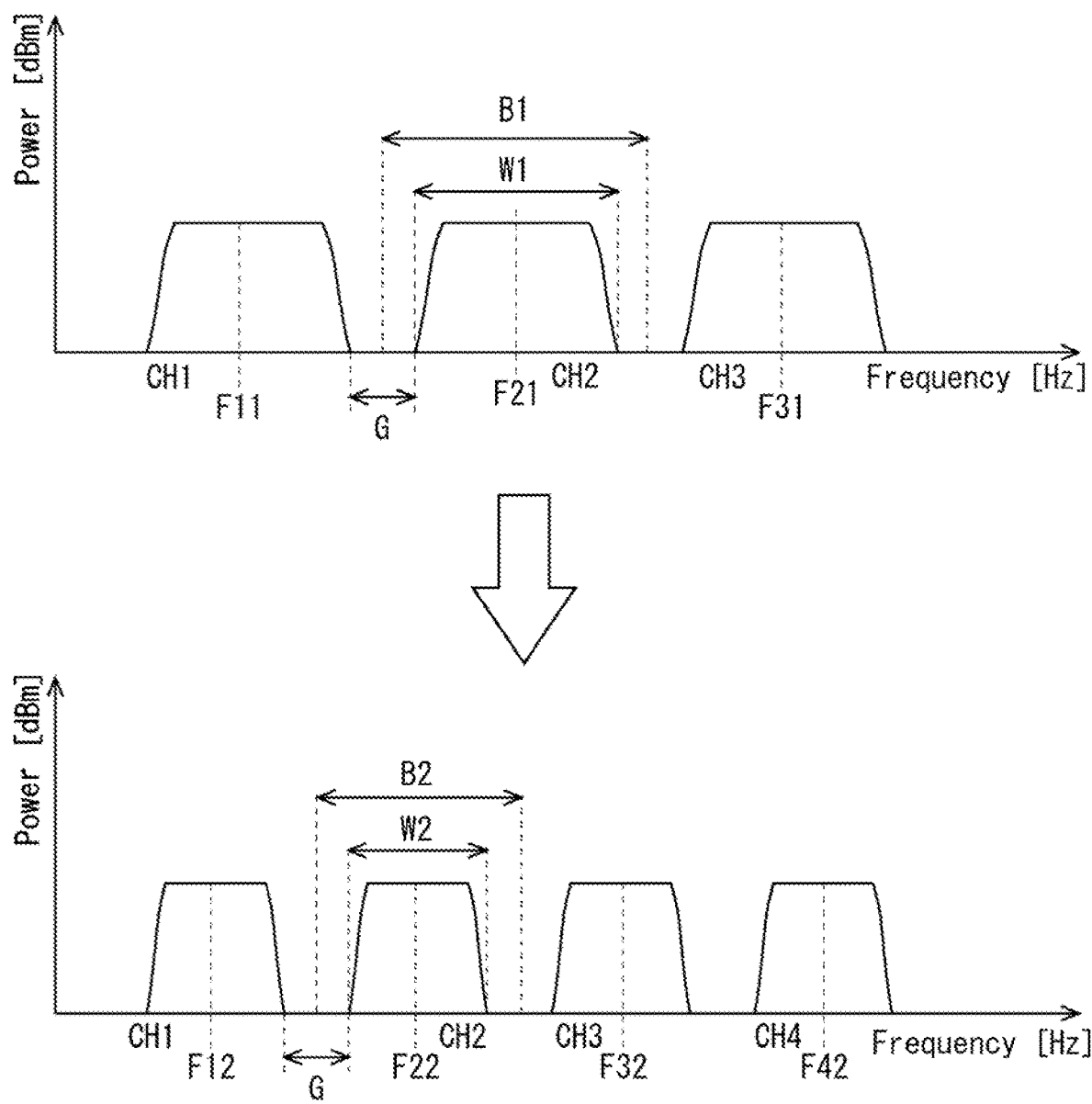
FIG. 4 is a schematic diagram illustrating control of increasing the number of communication channels in an optical communication line.

Now, with reference to FIG. 4, the control of increasing or reducing the number of communication channels in the optical communication line 25 will be described. FIG. 4 is a schematic diagram illustrating the control of increasing the number of communication channels in an optical communication line. The upper diagram in FIG. 4 illustrates the state held before the control, and the lower diagram in FIG. 4 illustrates the state held after the control. In the upper diagram in FIG. 4, the center frequencies of communication channels CH1, CH2, and CH3 are, respectively, F11, F21, and F31. Meanwhile, the bandwidth of each of the communication channels CH1 to CH3 is B1, and the WDM channel width is W1.

The controlling unit 23 changes the center frequencies of the communication channels CH1, CH2, and CH3 to, respectively, F12, F22, and F32, changes the bandwidth to B2, which is narrower than B1, and changes the WDM channel width to W2, which is narrower than W1. The controlling unit 23 performs the control of increasing the number of communication channels by adding a new communication channel CH4. The controlling unit 23 increases the number of communication channels by adding the new communication channel CH4, and thus although this control raises the FER in the optical communication line 25, the controlling unit 23 can increase the communication capacity of the optical communication line 25.

In one possible case, increasing the number of communication channels may cause the total amount of transmitted power output to the optical fibers constituting the optical communication line 25 to exceed the value of power that can be output to the optical fibers. Therefore, when the controlling unit 23 increases the number of communication channels and the total amount of transmitted power output to the optical communication line 25 exceeds the value of power that can be output to the optical communication line 25, the controlling unit 23 performs control of lowering the transmitted power of all the communication channels and then adding a new channel.

In another possible case, there may be a limitation on the power of an amplifier provided in the optical communication line 25. In this case, the controlling unit 23 performs control of reducing the amplification amount of all the communication channels and then adding a new channel.

As the control of reducing the number of communication channels in the optical communication line 25, the controlling unit 23 performs control that is opposite of the control of increasing the number of communication channels. The lower diagram in FIG. 4 illustrates the state held before the control, and the upper diagram in FIG. 4 illustrates the state held after the control. The controlling unit 23 changes the center frequencies of the communication channels CH1, CH2, and CH3 to, respectively, F11, F21, and F31, changes the bandwidth to B1, which is broader than B2, and changes the WDM channel width to W1, which is broader than W2. The controlling unit 23 performs the control of reducing the number of communication channels by deleting the communication channel CH4. The controlling unit 23 reduces the number of communication channels by deleting the communication channel CH4, and thus although this control reduces the communication capacity of the optical communication line 25, the controlling unit 23 can lower the FER in the optical communication line 25.

Figure 5:
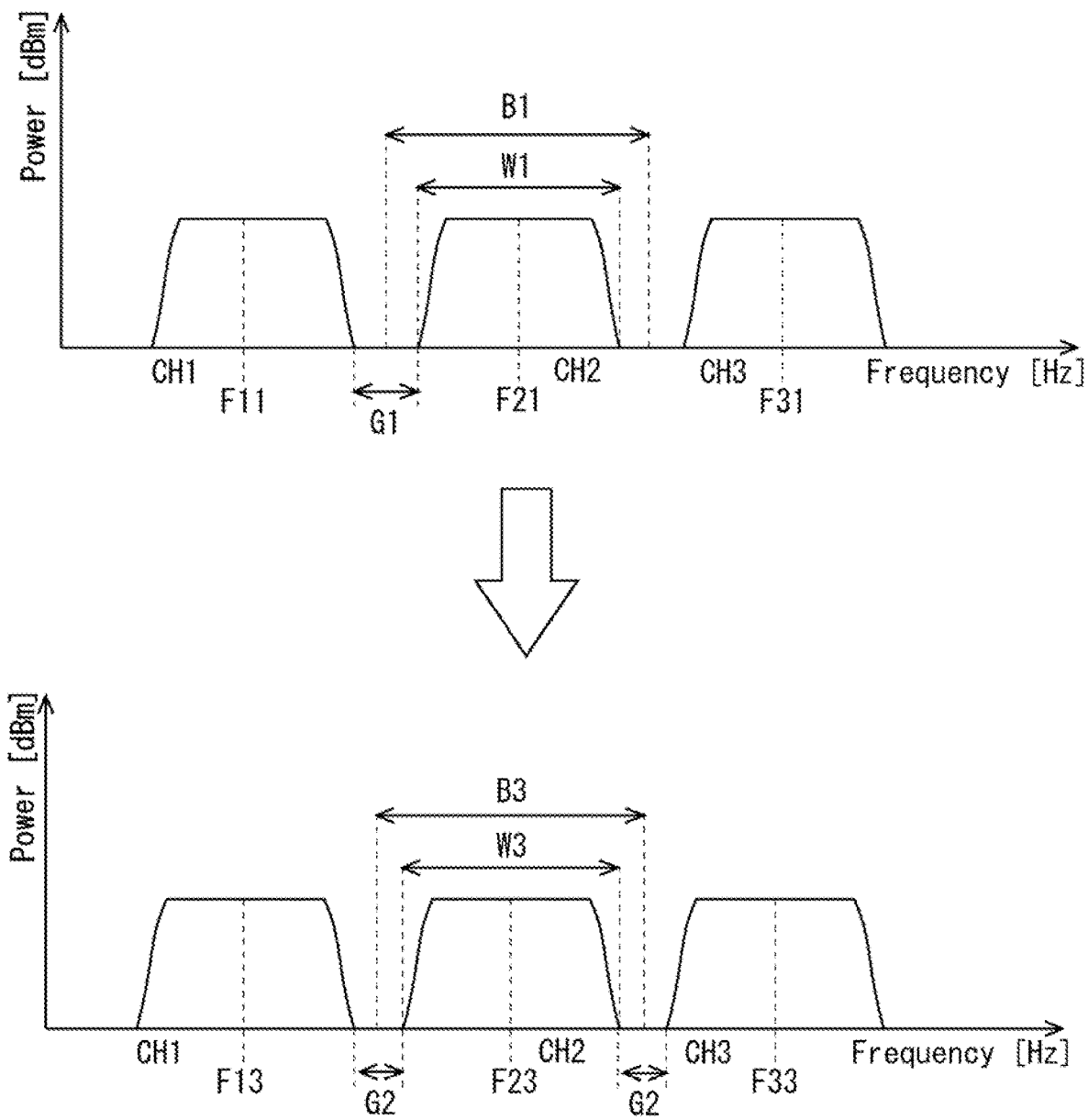
FIG. 5 is a schematic diagram illustrating control of narrowing a guard band width between communication channels in an optical communication line.

Next, with reference to FIG. 5, the control of changing the guard band width between the communication channels in the optical communication line 25 will be described. FIG. 5 is a schematic diagram illustrating control of narrowing a guard band width between communication channels in an optical communication line. The upper diagram in FIG. 5 illustrates the state held before the control, and the lower diagram in FIG. 5 illustrates the state held after the control. In the upper diagram in FIG. 5, the center frequencies of communication channels CH1, CH2, and CH3 are, respectively, F11, F21, and F31. Meanwhile, the bandwidth of each of the communication channels CH1 to CH3 is B1, the WDM channel width is W1, and the guard band width is G1.

The controlling unit 23 changes the guard band width between adjacent channels to G2, which is narrower than G1. To make them match the changed guard band width, the controlling unit 23 changes the center frequencies of the communication channels CH1, CH2, and CH3 to, respectively, F13, F23, and F33, changes the bandwidth to B3, which is broader than B1, and changes the WDM channel width to W3. The controlling unit 23 can broaden the bandwidth of each channel by narrowing the guard band width, and thus although this control raises the FER in the optical communication line 25, the controlling unit 23 can increase the communication capacity of the optical communication line 25.

As the control of broadening the guard band width between the communication channels in the optical communication line 25, the controlling unit 23 performs control that is opposite of the control of narrowing the guard band width. The lower diagram in FIG. 5 illustrates the state held before the control, and the upper diagram in FIG. 5 illustrates the state held after the control. The controlling unit 23 changes the guard band width to G1, which is broader than G2. To make them match the changed guard band width, the controlling unit 23 changes the center frequencies of the communication channels CH1, CH2, and CH3 to, respectively, F11, F21, and F31, changes the bandwidth to B1, which is narrower than B3, and changes the WDM channel width to W1. The controlling unit 23 can narrow the bandwidth of each channel by broadening the guard band width, and thus although this control reduces the communication capacity of the optical communication line 25, the controlling unit 23 can lower the FER in the optical communication line 25.

Next, the control of raising or lowering the multi-value level of the modulation scheme applied to the communication channels in the optical communication line 25 will be described. When the modulation scheme held before the control is, for example, 16 quadrature amplitude modulation (QAM) and when the controlling unit 23 is to raise the multi-value level of the modulation scheme, the controlling unit 23 changes the modulation scheme from 16QAM to 64QAM. When the modulation scheme held before the control is 64QAM and when the controlling unit 23 is to raise the multi-value level of the modulation scheme, the controlling unit 23 changes the modulation scheme from 64QAM to 256QAM.

Meanwhile, when the modulation scheme held before the control is 256QAM and when the controlling unit 23 is to lower the multi-value level of the modulation scheme, the controlling unit 23 changes the modulation scheme from 256QAM to 64QAM. When the modulation scheme held before the control is 64QAM and when the controlling unit 23 is to lower the multi-value level of the modulation scheme, the controlling unit 23 changes the modulation scheme from 64QAM to 16QAM.

Next, the FEC control will be described. When the throughput $b_{est}$ fails to fall below the required throughput $b_{target}$ and when the Q value and the OOF are each within a predetermined range, the controlling unit 23 executes the FEC control in accordance with the BER.

When the throughput $b_{est}$ fails to fall below the required throughput $b_{target}$ and when the Q value satisfies a predetermined range that is based on the Q value threshold and the OOF satisfies a predetermined range that is based on the OOF threshold, the controlling unit 23 executes the FEC control in the optical communication line 25. The predetermined ranges are each a range where the Q value or the OOF can be determined to have a permissible value. As the FEC control, the controlling unit 23 executes at least one of changing the parity length or control of applying probabilistic shaping.

When the throughput $b_{est}$, the required throughput $b_{target}$, the Q value, and the OOF satisfy the conditions above and when the BER is lower than a BER threshold, the controlling unit 23 reduces the FEC parity bits to reduce the parity length. Reducing the parity length causes the FER in the optical communication line 25 to rise but can reduce the overhead of signals caused by error correcting codes in the optical communication line 25, and thus the controlling unit 23 can increase the communication capacity of the optical communication line 25.

Meanwhile, when the throughput $b_{est}$, the required throughput $b_{target}$, the Q value, and the OOF satisfy the conditions above and when the BER is no lower than the BER threshold, which is the threshold for the BER, the controlling unit 23 increases the FEC parity bits to increase the parity length. Increasing the parity length causes the overhead to increase and thus causes the communication capacity of the optical communication line 25 to decrease, but the controlling unit 23 can lower the FER in the optical communication line 25.

When the throughput $b_{est}$, the required throughput $b_{target}$, the Q value, and the OOF satisfy the conditions above, the controlling unit 23 applies the probabilistic shaping in accordance with the OSNR. When the OSNR is lower than an OSNR threshold, which is a threshold for the OSNR, the controlling unit 23 uses flat or near-flat QAM. Meanwhile, when the OSNR is no lower than the OSNR threshold, the controlling unit 23, by applying the probabilistic shaping, increases the shaping with respect to the phase and the amplitude of a signal transmitted and received via the optical communication line 25.

For the sake of simplifying the description to be given hereinafter, the controlling unit 23 executes, as the communication capacity control, only the control of increasing or reducing the number of communication channels and executes, as the FEC control, only the control of increasing or reducing the parity length.

Example of Operation of Optical Transmitter Device

Figure 6:
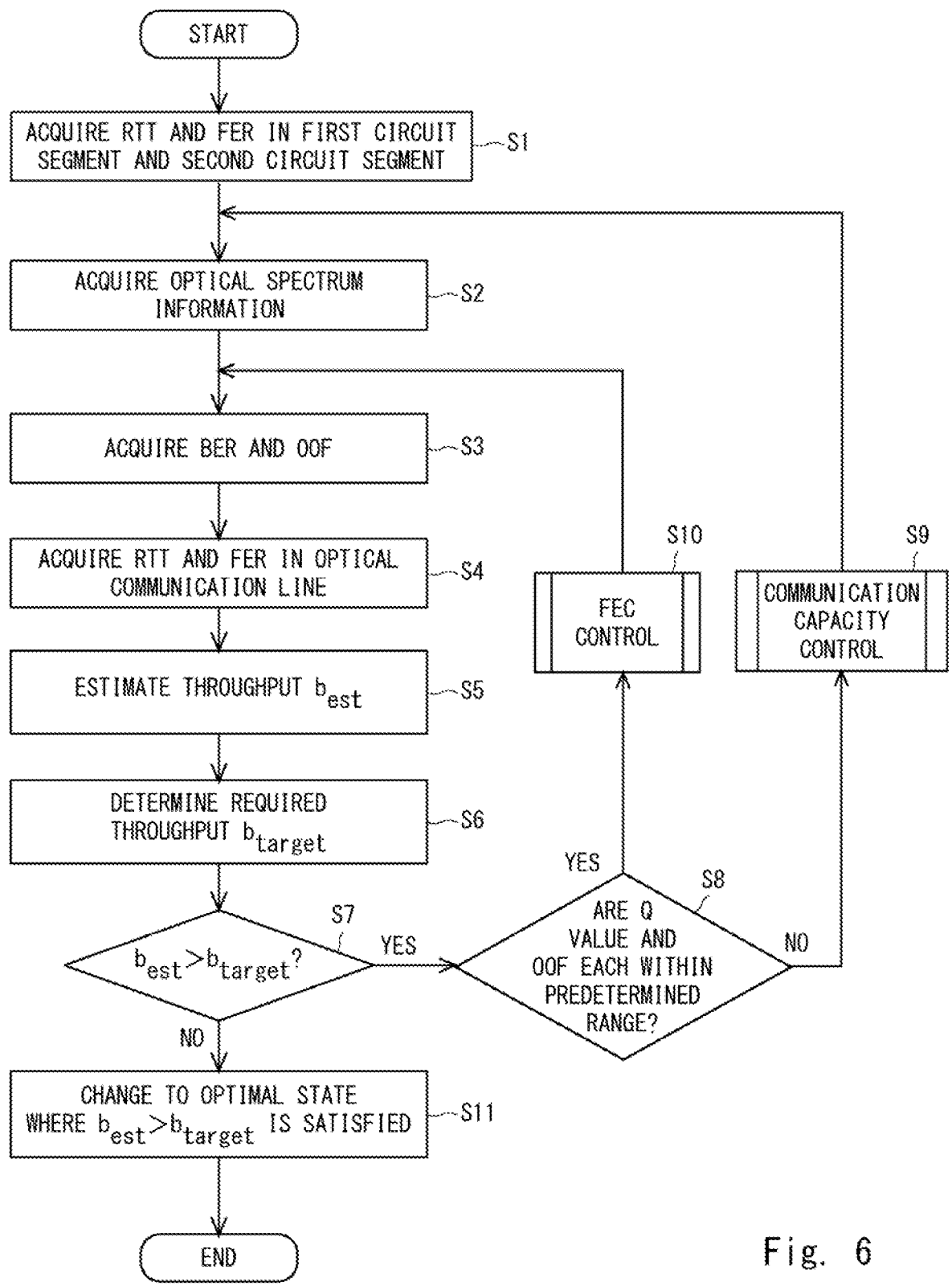
FIG. 6 is a flowchart illustrating an example of an operation of an optical transmitter device according to the first example embodiment.
Figure 7:
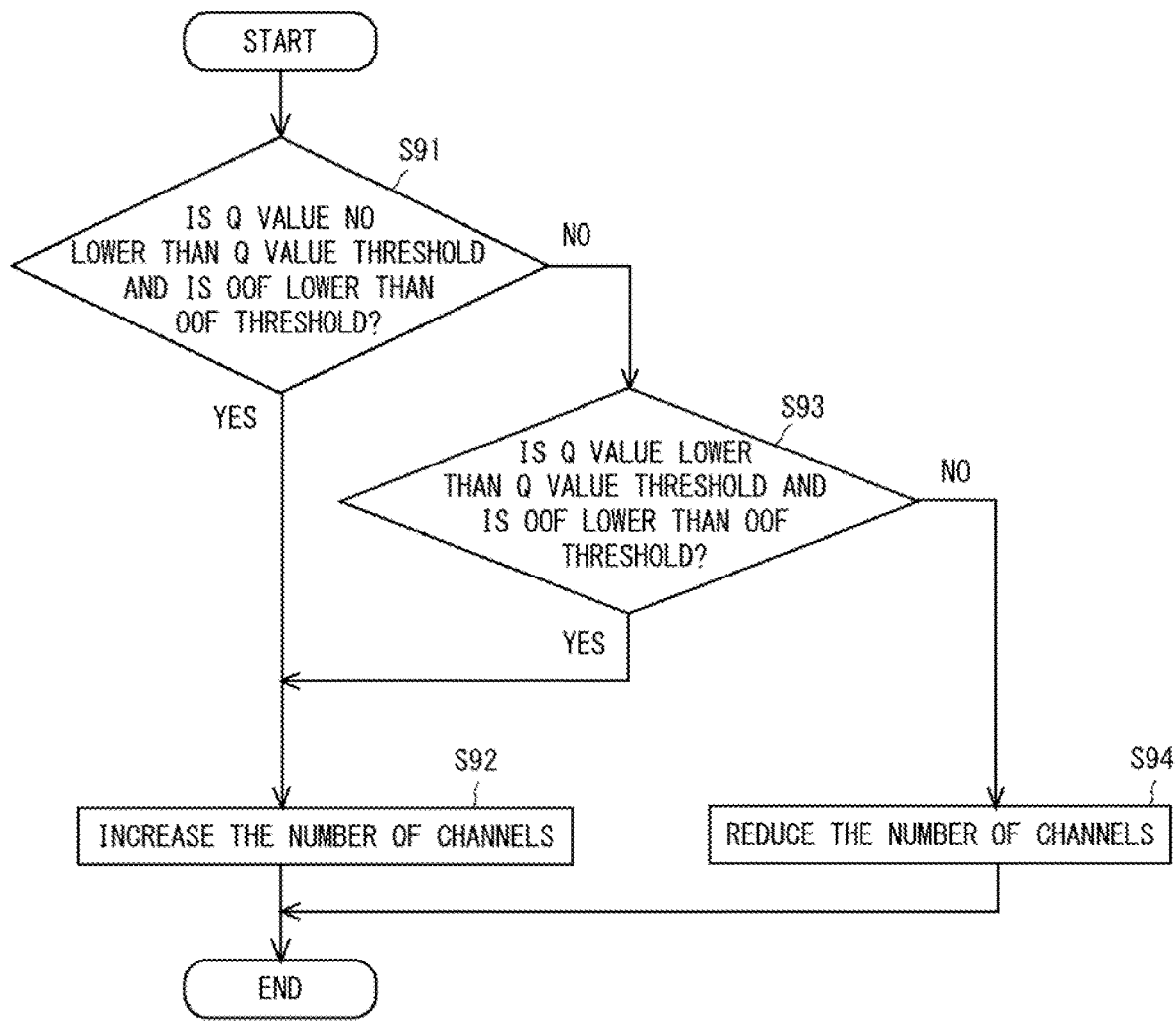
FIG. 7 is another flowchart illustrating an example of an operation of the optical transmitter device according to the first example embodiment.
Figure 8:
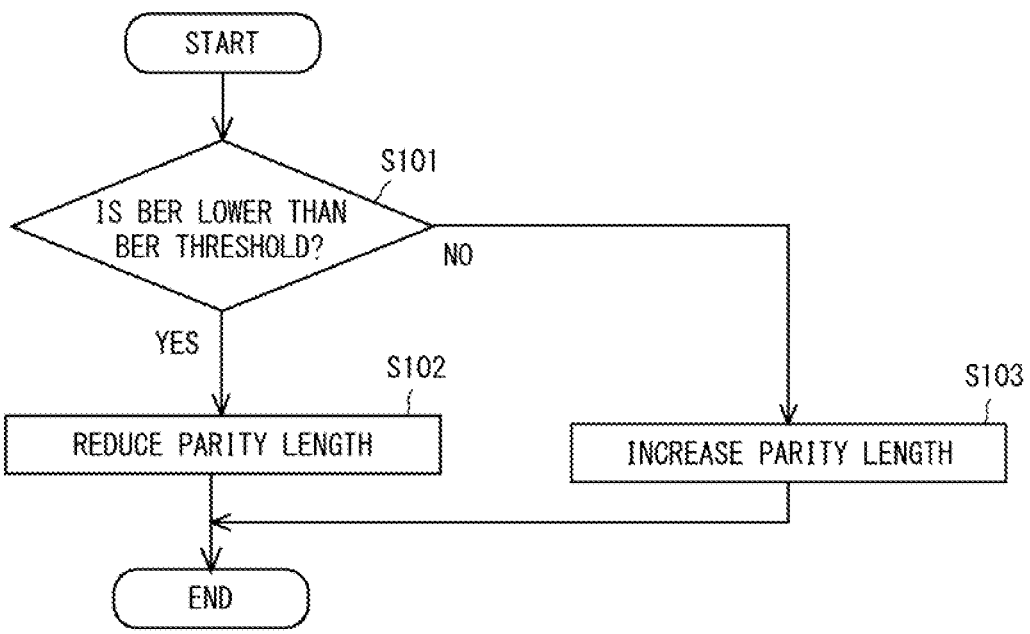
FIG. 8 is yet another flowchart illustrating an example of an operation of the optical transmitter device according to the first example embodiment.

Now, with reference to FIGS. 6 to 8, an example of an operation of the optical transmitter device 20 will be described. FIGS. 6 to 8 are flowcharts illustrating an example of an operation of an optical transmitter device according to the first example embodiment. The optical transmitter device 20 executes the operation illustrated in FIGS. 6 to 8 in an error-free communication state. In this example, the optical transmitter device 20 may start the process at any desired timing while the device is starting, and this process does not need to be started during communication.

The acquiring unit 21 acquires the RTTs and the FERs in the first circuit segment and the second circuit segment (step S1). The acquiring unit 21 acquires the RTT and the FER in the first circuit segment by measuring the RTT and the FER. The acquiring unit 21 acquires the RTT and the FER in the second circuit segment from the optical transmitter device 30.

The acquiring unit 21 acquires optical spectrum information (step S2). The acquiring unit 21 acquires, from the optical transmitter device 30, the intensity of received light in the communication channels in the optical communication line 25, the center frequency, the bandwidth, the guard band width, the WDM channel width, the OSNR, and the Q value.

The acquiring unit 21 acquires, from the optical transmitter device 30, the BER and the OOF of data (frame) transmitted and received via the optical communication line 25 (step S3) and acquires, from the optical transmitter device 30, the RTT and the FER in the optical communication line 25 (step S4).

The estimating unit 22 estimates the throughput $b_{est}$ (step S5) and determines the required throughput $b_{target}$ (step S6). The estimating unit 22 estimates the throughput $b_{est}$ and determines the required throughput $b_{target}$ by use of the RTTs and the FERs in the first circuit segment, the second circuit segment, and the optical communication line 25 that the acquiring unit 21 has acquired and the expressions (4) and (5). In this example, step S6 is executed only in the first instance after the process has started in an error-free communication state. In other words, the estimating unit 22 determines the required throughput $b_{target}$ only in the first instance after the process has started in an error-free communication state and does not determine the required throughput $b_{target}$ after the communication capacity control and the FEC control, each described later, have been executed.

Next, the controlling unit 23 determines whether the throughput $b_{est}$ satisfies the required throughput $b_{target}$ (step S7). If the throughput $b_{est}$ satisfies the required throughput $b_{target}$ (YES at step S7), the controlling unit 23 determines whether the Q value and the OOF are each within a predetermined range (step S8).

If neither the Q value nor the OOF is within its predetermined range (NO at step S8), the controlling unit 23 executes the communication capacity control (step S9). Then, the optical transmitter device 20 executes the operation at and after step S2.

Meanwhile, if the Q value and the OOF are each within its predetermined range (YES at step S8), the controlling unit 23 executes the FEC control (step S10). Then, the optical transmitter device 20 executes the operation at and after step S3.

If the throughput $b_{est}$ fails to satisfy the required throughput $b_{target}$ at step S7 (NO at step S7), the controlling unit 23 makes a change to achieve an optimal state in which the throughput $b_{est}$ satisfies the required throughput $b_{target}$ (step S11) and terminates the process. In this example, the optimal state is a state in which the throughput $b_{est}$ is at the lowest throughput that exceeds the required throughput $b_{target}$. In other words, at step S11, the controlling unit 23 executes control of reversing the control performed immediately before the throughput $b_{est}$ has fallen below the required throughput $b_{target}$ and terminates the process.

Next, FIG. 7 will be described. FIG. 7 is a flowchart illustrating an example of an operation in the communication capacity control executed at step S9 of FIG. 6.

The controlling unit 23 determines whether the Q value is no lower than the Q value threshold and whether the OOF is lower than the OOF threshold (step S91). If the Q value is no lower than the Q value threshold and if the OOF is lower than the OOF threshold (YES at step S91), the controlling unit 23 increases the number of communication channels in the optical communication line 25 (step S92). As illustrated in FIG. 4, the controlling unit 23 increases the number of communication channels by changing the center frequency of each communication channel, making the bandwidth narrower than the bandwidth held before the change, and adding a new communication channel.

In this example, when the controlling unit 23 increases the number of communication channels and when the total amount of transmitted power output to the optical communication line 25 exceeds the value of the power that can be output to the optical communication line 25, the controlling unit 23 performs control of lowering the transmitted power of all the communication channels and then adding a new channel.

If the Q value is lower than the Q value threshold and/or if the OOF is no lower than the OOF threshold (NO at step S91), the controlling unit 23 determines whether the Q value is lower than the Q value threshold and the OOF is lower than the OOF threshold (step S93). If the Q value is lower than the Q value threshold and the OOF is lower than the OOF threshold (YES at step S93), the controlling unit 23 increases the number of communication channels in the optical communication line 25 (step S92).

For example, if the determination condition that the Q value is lower than the Q value threshold and the OOF is lower than the OOF threshold, such as the case where the OOF is no lower than the OOF threshold (NO at step S93), the controlling unit 23 reduces the number of communication channels in the optical communication line 25 (step S94). The controlling unit 23 reduces the number of communication channels by changing the center frequency of each communication channel, making the bandwidth broader than the bandwidth held before the change, and deleting any one of the communication channels.

Next, FIG. 8 will be described. FIG. 8 is a flowchart illustrating an example of an operation in the FEC control executed at step S10 of FIG. 6.

The controlling unit 23 determines whether the BER is lower than the BER threshold (step S101). If the BER is lower than the BER threshold (YES at step S101), the controlling unit 23 reduces the FEC parity bits to reduce the parity length (step S102). Meanwhile, if the BER is no lower than the BER threshold (NO at step S101), the controlling unit 23 increases the FEC parity bits to increase the parity length (step S103).

As described thus far, the estimating unit 22 estimates the throughput of the terminal device 40 and determines the required throughput of the terminal device 40 based on the quality information acquired by the acquiring unit 21. The controlling unit 23 executes the communication capacity control and the FEC control so that the throughput satisfies the required throughput and thus raises the communication capacity higher than the communication capacity held in an error-free communication state. Thus, the use of the optical transmitter device 20 according to the first example embodiment makes it possible to deliver an improvement in the communication capacity of the optical communication line 25 with the throughput satisfying the required throughput. In other words, the optical transmitter device 20 according to the first example embodiment can deliver an improvement in the communication capacity of communication infrastructure with the quality of communication taken into consideration.

As described above, the communication capacity of the optical communication line 25 is expected to be in proportion to the total throughput until the total throughput of data transmitted and received via the optical communication line 25 reaches a specific value. Therefore, the communication capacity can be improved effectively by adjusting, as appropriate, a in the expression (5) for calculating the required throughput or the constant D in the expressions (4) and (5).

In an error-free communication state, the signal error rate (e.g., the FER) in the optical communication line 25 is extremely lower than the signal error rate in an access circuit, such as the circuit 15 or the circuit 35. Therefore, even when the signal error rate in the optical communication line 25 is lowered, an influence on the throughput at an end user is expected to be extremely small. In other words, the optical transmitter device 20 according to the first example embodiment can efficiently deliver an improvement in the communication capacity of the optical communication line 25 with any influence on the throughput at an end user suppressed. Then, this efficient improvement in the communication capacity allows a communication service provider to reduce the cost of investment in the equipment and to benefit from lower cost advantages.

The following modifications may be adopted according to the first example embodiment described above.

Modification Example 1

According to the first example embodiment described above, the optical transmitter device 20 includes the acquiring unit 21, the estimating unit 22, and the controlling unit 23. Alternatively, the optical transmitter device 30 may include the acquiring unit 21, the estimating unit 22, and the controlling unit 23.

The acquiring unit 21 acquires the RTT and the FER in the optical communication line 25 and the RTT in the second circuit segment by measuring the RTTs and the FER. The acquiring unit 21 determines the FER in the second circuit segment based on the communication service provider that provides the circuit 35. The acquiring unit 21 acquires the RTT and the FER in the first circuit segment from the optical transmitter device 20.

The acquiring unit 21 acquires the Q value in the optical communication line 25 by calculating the Q value. The acquiring unit 21 acquires the OOF of data (frame) transmitted and received via the optical communication line 25 and the BER of this data by measuring the OOF and the BER.

The acquiring unit 21 acquires optical spectrum information of the optical communication line 25 by measuring the optical spectrum information. Specifically, the acquiring unit 21 acquires the intensity of received light in the communication channels in the optical communication line 25, the center frequency, the bandwidth, the guard band, the WDM channel width, and the OSNR by measuring these pieces of information.

As with the first example embodiment, the estimating unit 22 estimates the throughput and determines the required throughput by use of the RTTs and the FERs in the first circuit segment, the optical communication line 25, and the second circuit segment and the expressions (4) and (5).

As with the first example embodiment, the controlling unit 23 executes the communication capacity control and the FEC control. Upon determining the content of the communication capacity control and the FEC control, the controlling unit 23 informs the optical transmitter device 20 of the determined content and executes the communication capacity control and the FEC control via the optical transmitter device 20.

As described above, even when the optical transmitter device 30 includes the components of the optical transmitter device 20 according to the first example embodiment, advantageous effects similar to those according to the first example embodiment can be obtained.

Modification Example 2

The estimating unit 22 determines the required throughput by use of the expression (5) described above, and the estimating unit 22 may adjust this determined required throughput based on the communication quality value (throughput) required by the respective communication service providers that provide the communication line of the first circuit segment and the communication line of the second circuit segment.

Specifically, for example, the communication service provider that provides the circuit 15 (the first circuit segment) is a company A, and the communication service provider that provides the circuit 35 (the second circuit segment) is a company B. The upper limit of the throughput that the company A requires is 200 Mbps, and the upper limit of the throughput that the company B requires is 50 Mbps. The required throughput that the estimating unit 22 has determined is 300 Mbps. Then, when the required throughput is higher than 50 Mbps, which is the lower one of the upper limits of the throughput required by the communication service providers that provide the circuit 15 and the circuit 35, the estimating unit 22 may use 50 Mbps as the required throughput.

Alternatively, for example, the lower limit (the lowest value) of the throughput that the company A requires is 200 Mbps, and the lower limit (the lowest value) of the throughput that the company B requires is 50 Mbps. The required throughput that the estimating unit 22 has determined is 300 Mbps. Then, when the required throughput is lower than 50 Mbps, which is the lower one of the lower limits of the throughput required by the communication service providers that provide the circuit 15 and the circuit 35, the estimating unit 22 may use 50 Mbps as the required throughput. In these examples, the estimating unit 22 may determine the required throughput based on the combination of the communication service providers that provide the circuit 15 and the circuit 35 and the circuit type of each of the circuit 15 and the circuit 35. Even with these modifications, advantageous effects similar to those according to the first example embodiment can be obtained, and the required throughput appropriate for the throughput required by a communication service provider can be set.

Modification Example 3

The estimating unit 22 determines the required throughput by use of the expression (5) described above, and the estimating unit 22 may adjust this required throughput based on the user profile between the end user terminals. A user profile is an index representing the performance required by users, and the acquiring unit 21 or the estimating unit 22 may determine the user profile based on the IP addresses transmitted to the terminal device 10 and the terminal device 40.

For example, when the communication between the terminal device 10 and the terminal device 40 is communication between data centers, the acquiring unit 21 or the estimating unit 22 determines that the user profile is Data Center (DC). When the user profile is DC and the throughput required for DC is 10 Gbps, the estimating unit 22 may set the required throughput to 10 Gbps.

Meanwhile, for example, when the communication between the terminal device 10 and the terminal device 40 is communication between a data center and a general user, the acquiring unit 21 or the estimating unit 22 determines that the user profile is DCtoHome. When the user profile is DCtoHome and the throughput required for DCtoHome is 100 Mbps, the estimating unit 22 may set the required throughput to 100 Mbps. Even with these modifications, advantageous effects similar to those according to the first example embodiment can be obtained, and the required throughput appropriate for a user profile can be set.

Modification Example 4

In the foregoing description, the controlling unit 23 executes the communication capacity control in accordance with the Q value and the OOF. Alternatively, the controlling unit 23 may execute the communication capacity control based on burst error information pertaining to a burst error in the optical communication line 25. The acquiring unit 21 acquires the rate of occurrence of burst errors in data (frame) transmitted and received via the optical communication line 25 and the duration of burst errors.

The controlling unit 23 may execute the control of reducing the communication capacity of the optical communication line 25 when at least one of a case where the acquired rate of occurrence exceeds a rate of burst error occurrence threshold or a case where the duration exceeds a burst error duration threshold is satisfied. As the control of reducing the communication capacity, the controlling unit 23 may execute at least one of control of reducing the number of communication channels in the optical communication line 25, control of broadening the guard band width between the communication channels, or control of lowering the multi-value level of the modulation scheme. With this modification, advantageous effects similar to those according to the first example embodiment can be obtained, and a higher quality of communication can be provided to the terminal device 40.

Modification Example 5

In the foregoing description, the controlling unit 23 executes the communication capacity control in accordance with the Q value and the OOF. The Q value is quality information related to the BER. Another piece of information related to the BER is a signal-to-noise ratio. Therefore, the controlling unit 23 may execute the communication capacity control by use of, for example, the signal-to-noise ratio, such as the OSNR, instead of the Q value. In other words, the controlling unit 23 may execute the communication capacity control in accordance with the OSNR and the OOF in the first example embodiment described above.

Second Example Embodiment

Next, a second example embodiment will be described. According to the second example embodiment, the process that the optical transmitter device 20 according to the first example embodiment performs is performed by a network monitoring device. Although the description is omitted below, the modification examples 2 to 5 according to the first example embodiment may be applied also to the second example embodiment.

Example of Configuration of Optical Communication System

Figure 9:
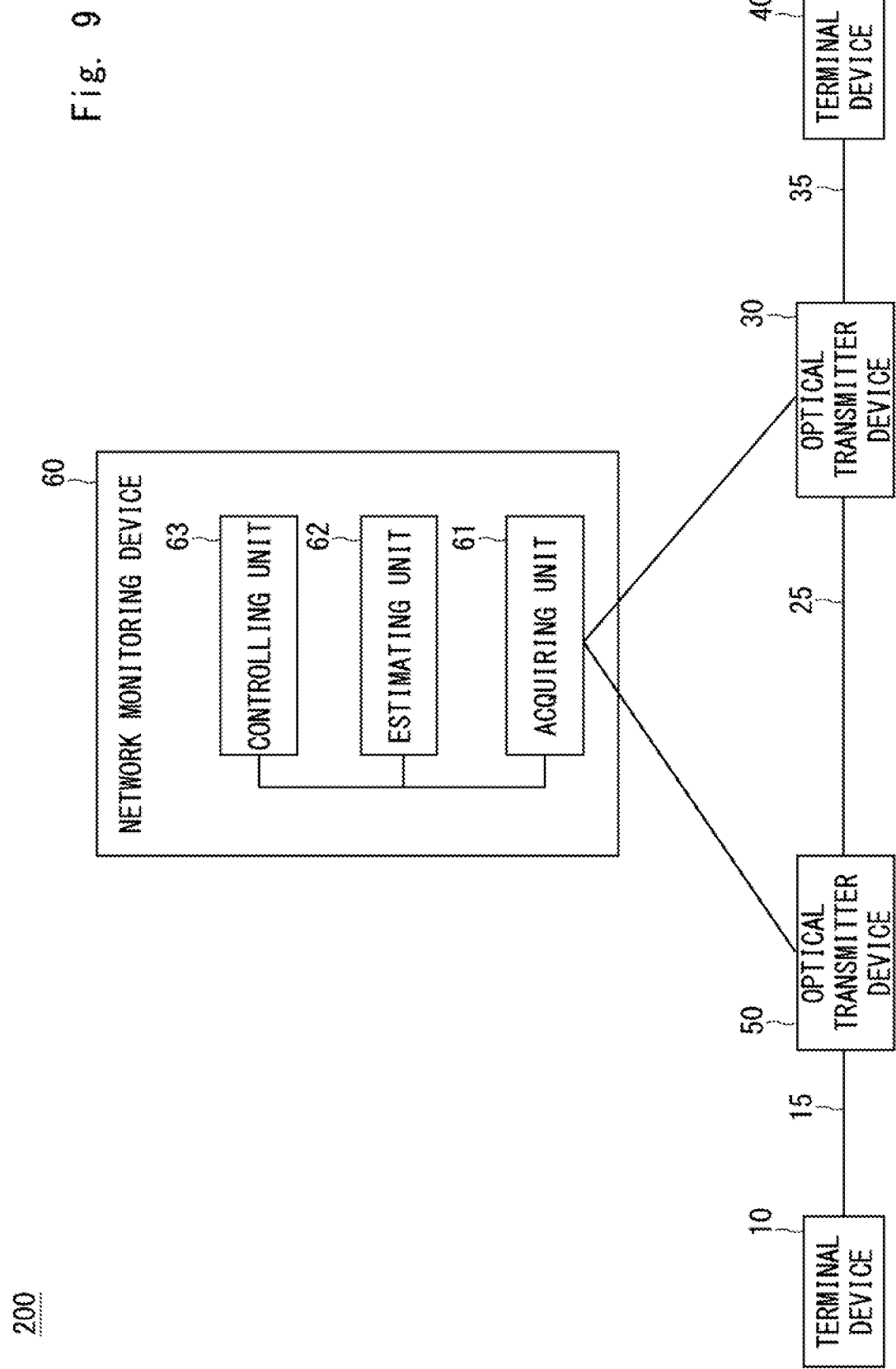
FIG. 9 illustrates an example of a configuration of an optical communication system according to a second example embodiment.

With reference to FIG. 9, an example of a configuration of an optical communication system 200 according to the second example embodiment will be described. FIG. 9 illustrates an example of a configuration of an optical communication system according to the second example embodiment. The optical communication system 200 includes terminal devices 10 and 40, optical transmitter devices 30 and 50, and a network monitoring device 60.

The optical communication system 200 includes the network monitoring device 60 in addition to the components of the optical communication system 100 according to the first example embodiment. Moreover, the configuration of the optical communication system 200 is such that the optical transmitter device 20 in the optical communication system 100 according to the first example embodiment is replaced by the optical transmitter device 50. The configuration of each of the terminal devices 10 and 40 and the optical transmitter device 30 is basically similar to its counterpart according to the first example embodiment, and thus description thereof will be omitted, as appropriate.

The optical transmitter device 30 measures the RTT in the second circuit segment and transmits the measured RTT in the second circuit segment to the network monitoring device 60. The optical transmitter device 30 identifies the communication service provider that provides the circuit 35 based on the acquired IP address and determines the FER in the second circuit segment based on the communication service provider. The optical transmitter device 30 transmits the determined FER in the second circuit segment to the network monitoring device 60.

In this example, the optical transmitter device 30 may identify the communication service provider that provides the circuit 35 based on the acquired IP address and transmit the identified communication service provider to the network monitoring device 60. Then, the network monitoring device 60 may determine and acquire the FER in the second circuit segment based on the identified communication service provider.

The optical transmitter device 30 measures the RTT and the FER in the optical communication line 25 and transmits the measured RTT and FER to the network monitoring device 60.

The optical transmitter device 30 acquires the OOF of data (frame) transmitted and received via the optical communication line 25 and the BER of this data. The optical transmitter device 30 transmits the acquired OOF and BER to the network monitoring device 60.

The optical transmitter device 30 acquires optical spectrum information of the optical communication line 25. The optical transmitter device 30 measures the intensity of received light in the communication channels in the optical communication line 25, the center frequency, the bandwidth, the guard band, the WDM channel width, and the OSNR. Moreover, the optical transmitter device 30 calculates the Q value of the optical communication line 25. The optical transmitter device 30 transmits the optical spectrum information to the network monitoring device 60. Specifically, the optical transmitter device 30 transmits, to the network monitoring device 60, the intensity of received light in the communication channels in the optical communication line 25, the center frequency, the bandwidth, the guard band, the WDM channel width, the OSNR, and the Q value of the optical communication line 25.

The optical transmitter device 50 measures the RTT in the first circuit segment and transmits the measured RTT in the first circuit segment to the network monitoring device 60. The optical transmitter device 50 identifies the communication service provider that provides the circuit 15 based on the acquired IP address and determines the FER in the first circuit segment based on the identified communication service provider. The optical transmitter device 50 transmits the determined FER in the first circuit segment to the network monitoring device 60.

In this example, the optical transmitter device 50 may identify the communication service provider that provides the circuit 15 based on the acquired IP address and transmit the identified communication service provider to the network monitoring device 60. Then, the network monitoring device 60 may determine and acquire the FER in the first circuit segment based on the identified communication service provider.

The network monitoring device 60 corresponds to the communication device 1 according to the overview of the example embodiments. The network monitoring device 60 monitors the entire network in the optical communication system 200. The network monitoring device 60 may be referred to as a network management system (NMS). The network monitoring device 60 is connected to the optical transmitter devices 30 and 50 and can communicate with the optical transmitter devices 30 and 50 via a network. The network monitoring device 60 monitors the optical transmitter devices 30 and 50 and performs control via the optical transmitter devices 30 and 50.

Example of Configuration of Network Monitoring Device

Next, an example of a configuration of the network monitoring device 60 will be described. The network monitoring device 60 includes an acquiring unit 61, an estimating unit 62, and a controlling unit 63.

The acquiring unit 61 corresponds to the acquiring unit 21 according to the first example embodiment. The acquiring unit 61 acquires the RTT and the FER in the first circuit segment from the optical transmitter device 50. The acquiring unit 61 acquires the RTTs and the FERs in the second circuit segment and the optical communication line 25 from the optical transmitter device 30.

The acquiring unit 61 acquires the BER of data (frame) transmitted and received via the optical communication line 25 and the OOF of this data from the optical transmitter device 30.

The acquiring unit 61 acquires optical spectrum information from the optical transmitter device 30. Specifically, the acquiring unit 61 acquires, from the optical transmitter device 30, the intensity of received light in the communication channels in the optical communication line 25, the center frequency, the bandwidth, the guard band, the WDM channel width, the OSNR, and the Q value of the optical communication line 25.

The estimating unit 62 corresponds to the estimating unit 22 according to the first example embodiment. The estimating unit 62 estimates the throughput $b_{est}$ and determines the required throughput $b_{target}$ by use of the RTTs and the FERs in the first circuit segment, the second circuit segment, and the optical communication line 25 that the acquiring unit 61 has acquired and the expressions (4) and (5).

The controlling unit 63 corresponds to the controlling unit 23 according to the first example embodiment. The configuration of the controlling unit 63 is basically similar to that of the controlling unit 23, and the content of the control performed by the controlling unit 63 is similar to that performed by the controlling unit 23 according to the first example embodiment. Thus, description thereof will be omitted. Upon determining the content of the communication capacity control and the FEC control, the controlling unit 63 informs the optical transmitter devices 30 and 50 of the determined content and executes the control of the determined content via the optical transmitter device 50.

Example of Operation of Network Monitoring Device

Next, an example of an operation of the network monitoring device will be described. The operation of the network monitoring device 60 is basically similar to the example of the operation of the optical transmitter device 30 according to the first example embodiment and thus will be described with omissions, as appropriate, with reference to FIGS. 6 to 8. The network monitoring device 60 executes the operations illustrated in FIGS. 6 to 8 in an error-free communication state. In this example, the network monitoring device 60 may start the process at a desired timing while the optical transmitter devices 30 and 50 are starting.

The acquiring unit 61 acquires the RTTs and the FERs in the first circuit segment and the second circuit segment from the optical transmitter devices 30 and 50 (step S1). The acquiring unit 61 acquires the RTT and the FER in the first circuit segment from the optical transmitter device 50 and acquires the RTT and the FER in the second circuit segment from the optical transmitter device 30.

The acquiring unit 61 acquires optical spectrum information from the optical transmitter device 30 (step S2). The acquiring unit 61 acquires, from the optical transmitter device 30, the intensity of received light in the communication channels in the optical communication line 25, the center frequency, the bandwidth, the guard band, the WDM channel width, the OSNR, and the Q value of the optical communication line 25.

The acquiring unit 61 acquires, from the optical transmitter device 30, the BER and the OOF of data (frame) transmitted and received via the optical communication line 25 (step S3) and acquires, from the optical transmitter device 30, the RTT and the FER in the optical communication line 25 (step S4).

The estimating unit 62 estimates the throughput $b_{est}$ (step S5) and determines the required throughput $b_{target}$ (step S6). The estimating unit 62 estimates the throughput $b_{est}$ and determines the required throughput $b_{target}$ by use of the RTTs and the FERs in the first circuit segment, the second circuit segment, and the optical communication line 25 that the acquiring unit 61 has acquired and the expressions (4) and (5). In this example, step S6 is executed only in the first instance after the process has started in an error-free communication state. In other words, the estimating unit 62 determines the required throughput $b_{target}$ only in the first instance after the process has started in an error-free communication state and does not determine the required throughput $b_{target}$ after the communication capacity control and the FEC control, each described later, have been executed.

Next, the controlling unit 63 determines whether the throughput $b_{est}$ satisfies the required throughput $b_{target}$ (step S7). If the throughput $b_{est}$ satisfies the required throughput $b_{target}$ (YES at step S7), the controlling unit 63 determines whether the Q value and the OOF are each within a predetermined range (step S8).

If neither the Q value nor the OOF is within its predetermined range (NO at step S8), the controlling unit 63 executes the communication capacity control (step S9). The controlling unit 63 informs the optical transmitter devices 30 and 50 of the content of the communication capacity control and performs the control via the optical transmitter device 50. Then, the network monitoring device 60 executes the operation at and after step S2.

Meanwhile, if the Q value and the OOF are each within its predetermined range (YES at step S8), the controlling unit 63 executes the FEC control (step S10). The controlling unit 63 informs the optical transmitter devices 30 and 50 of the content of the FEC control and performs the control via the optical transmitter device 50. Then, the network monitoring device 60 executes the operation at and after step S3.

If the throughput $b_{est}$ fails to satisfy the required throughput $b_{target}$ at step S7 (NO at step S7), the controlling unit 63 makes a change to achieve an optimal state in which the throughput $b_{est}$ satisfies the required throughput $b_{target}$ (step S11) and terminates the process.

The controlling unit 63 informs the optical transmitter devices 30 and 50 that a change is to be made to achieve an optimal state and makes that change to the optimal state via the optical transmitter device 50. In this example, the optimal state is a state in which the throughput $b_{est}$ is at the lowest throughput that exceeds the required throughput $b_{target}$. In other words, at step S11, the controlling unit 63 executes, via the optical transmitter device 50, control of reversing the control performed immediately before the throughput $b_{est}$ has fallen below the required throughput $b_{target}$ and then terminates the process.

The communication capacity control and the FEC control executed at steps S9 and S10 are similar to those illustrated in FIGS. 7 and 8, and thus description thereof will be omitted. In this example, upon determining the content of each control, the controlling unit 63 informs the optical transmitter devices 30 and 50 and executes the control on the optical communication line 25 via the optical transmitter device 50.

As described thus far, even when the network monitoring device 60 executes the process that is executed by the optical transmitter device 20 according to the first example embodiment, advantageous effects similar to those according to the first example embodiment can be obtained. In other words, as with the first example embodiment, the use of the network monitoring device 60 according to the second example embodiment also makes it possible to deliver an improvement in the communication capacity of the optical communication line 25 with the throughput satisfying the required throughput. Accordingly, the network monitoring device 60 according to the second example embodiment can deliver an improvement in the communication capacity of communication infrastructure with the quality of communication taken into consideration.

Other Example Embodiments

<1> The quality of communication and the required quality of communication are each indicated by the throughput according to the foregoing example embodiments. Alternatively, the quality of communication and the required quality of communication may each be indicated by the FER. When the quality of communication and the required quality of communication are each indicated by the FER, the control may be performed so that $p_{est}$ falls below the required FER that is based on $p_{e2e}$. Even with this configuration, advantageous effects similar to those according to the foregoing example embodiments can be obtained.

Figure 10:
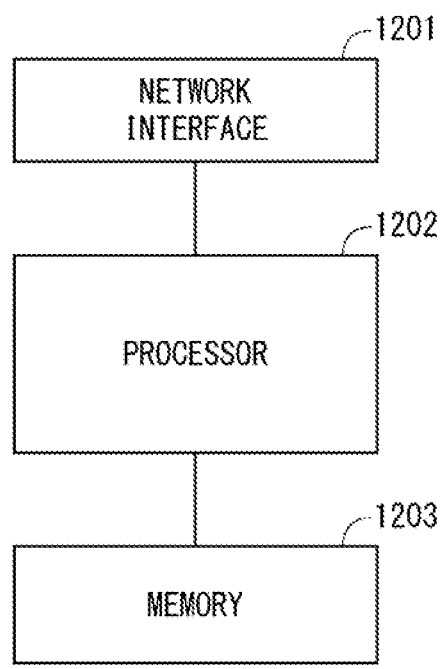

<2> FIG. 10 is a block diagram illustrating an example of a hardware configuration of the communication device 1, the optical transmitter devices 20, 30, and 50, and the network monitoring device 60 (referred to below as the communication device 1 and so on) described according to the foregoing example embodiments. With reference to FIG. 10, the communication device 1 and so on each include a network interface 1201, a processor 1202, and a memory 1203. The network interface 1201 is used to communicate with another communication device included in an optical communication system, such as an optical transmitter device, a terminal device, or a network monitoring device.

The processor 1202 reads out software (computer program) from the memory 1203 and executes the software. Thus, the processor 1202 implements the processes of the communication device 1 and so on described with reference to the flowcharts according to the foregoing example embodiments. The processor 1202 may be, for example, a microprocessor, a microprocessing unit (MPU), or a central processing unit (CPU). The processor 1202 may include a plurality of processors.

The memory 1203 is constituted by a combination of a volatile memory and a non-volatile memory. The memory 1203 may include a storage provided apart from the processor 1202. In this case, the processor 1202 may access the memory 1203 via an I/O interface (not illustrated).

In the example illustrated in FIG. 10, the memory 1203 is used to store a set of software modules. The processor 1202 can read out this set of software modules from the memory 1203 and execute this set of software modules. Thus, the processor 1202 can perform the processes of the communication device 1 and so on described according to the foregoing example embodiments.

As described with reference to FIG. 10, each of the processors included in the communication device 1 and so on executes one or more programs including a set of instructions that cause a computer to execute the algorithms described with reference to the drawings.

In the foregoing examples, the program can be stored and provided to a computer by use of various types of non-transitory computer-readable media. Such non-transitory computer-readable media include various types of tangible storage media. Examples of such non-transitory computer-readable media include a magnetic storage medium (e.g., a flexible disk, a magnetic tape, a hard-disk drive), a magneto-optical recording medium (e.g., a magneto-optical disk). Additional examples of such non-transitory computer-readable media include a CD-ROM (read-only memory), a CD-R, and a CD-R/W. Yet additional examples of such non-transitory computer-readable media include a semiconductor memory. Examples of a semiconductor memory include a mask ROM, a programmable ROM (PROM), an erasable PROM (EPROM), a flash ROM, or a random-access memory (RAM). The program may also be supplied to a computer by use of various types of transitory computer-readable media. Examples of such transitory computer-readable media include an electric signal, an optical signal, and an electromagnetic wave. A transitory computer-readable medium can supply the program to a computer via a wired communication line, such as an electric wire or an optical fiber, or via a wireless communication line.

It is to be noted that the present disclosure is not limited to the foregoing example embodiments, and modifications can be made, as appropriate, within the scope that does not depart from the technical spirit. Moreover, the present disclosure may be implemented by combining the example embodiments, as appropriate.

A part or the whole of the foregoing example embodiments can also be expressed as in the following supplementary notes, which are not limiting.

(Supplementary note 1) A communication device including: acquiring means configured to acquire quality information of a communication line, the communication line extending from a first communication device to a second communication device and including an optical communication line; estimating means configured to estimate a quality of communication of the second communication device and determine a required quality of communication of the second communication device based on the quality information; and controlling means configured to perform control on communication channels in the optical communication line so that the quality of communication satisfies the required quality of communication.

(Supplementary note 2) The communication device according to Supplementary note 1, in which the controlling means is configured to execute at least one of first control or second control so that the quality of communication satisfies the required quality of communication, the first control including changing at least one of a communication channel configuration or a modulation scheme of the communication channels, the second control including changing an error correction process to be applied to the communication channels.

(Supplementary note 3) The communication device according to Supplementary note 2, in which the acquiring means is configured to acquire an optical quality value of the communication channels and a detection failure rate of detecting data transmitted via the communication channels, and the controlling means is configured to execute the first control in accordance with the optical quality value and the detection failure rate if the quality of communication fails to satisfy a predetermined condition that is based on the required quality of communication.

(Supplementary note 4) The communication device according to Supplementary note 3, in which the controlling means is configured to execute, as the first control, at least one of changing the number of the communication channels, changing a guard band width between the communication channels, or changing the modulation scheme.

(Supplementary note 5) The communication device according to Supplementary note 4, in which the controlling means is configured to change the number of the communication channels and the guard band width by changing a center frequency and a bandwidth of each of the communication channels.

(Supplementary note 6) The communication device according to Supplementary note 4 or 5, in which the controlling means is configured to execute at least one of control of increasing the number of the communication channels, control of narrowing the guard band width, or control of raising a multi-value level of the modulation scheme if the optical quality value is no lower than a first threshold and the detection failure rate is lower than a second threshold.

(Supplementary note 7) The communication device according to any one of Supplementary notes 4 to 6, in which the controlling means is configured to execute at least one of control of increasing the number of the communication channels, control of narrowing the guard band width, or control of raising a multi-value level of the modulation scheme if the optical quality value is lower than a first threshold and the detection failure rate is lower than a second threshold.

(Supplementary note 8) The communication device according to any one of Supplementary notes 4 to 7, in which the controlling means is configured to execute at least one of control of reducing the number of the communication channels, control of broadening the guard band width, or control of lowering a multi-value level of the modulation scheme if the optical quality value is lower than a first threshold and the detection failure rate is no lower than a second threshold.

(Supplementary note 9) The communication device according to any one of Supplementary notes 4 to 8, in which the controlling means is configured to lower a transmitted power of the communication channels if the number of the communication channels is to be increased and if a total amount of transmitted power output to the optical communication line exceeds a value of power that can be output to the optical communication line.

(Supplementary note 10) The communication device according to any one of Supplementary notes 4 to 9, in which the acquiring means is configured to acquire burst error information pertaining to a burst error in the optical communication line, and the controlling means is configured to execute at least one of control of reducing the number of the communication channels, control of broadening the guard band width, or control of lowering a multi-value level of the modulation scheme if the burst error information exceeds a third threshold.

(Supplementary note 11) The communication device according to Supplementary note 10, in which the burst error information includes a rate of occurrence of the burst error and a duration of the burst error.

(Supplementary note 12) The communication device according to any one of Supplementary notes 3 to 11, in which the acquiring means is configured to further acquire a first error rate indicating an error rate held before an error correction of the data, and the controlling means is configured to execute the second control in accordance with the first error rate if the quality of communication fails to satisfy the predetermined condition and if the optical quality value and the detection failure rate are within respective predetermined ranges.

(Supplementary note 13) The communication device according to Supplementary note 12, in which the controlling means is configured to, as the second control, change a parity length used in the error correction.

(Supplementary note 14) The communication device according to Supplementary note 13, in which the controlling means is configured to increase the parity length if the first error rate is no lower than a third threshold.

(Supplementary note 15) The communication device according to Supplementary note 13 or 14, in which the controlling means is configured to reduce the parity length if the first error rate is lower than a third threshold.

(Supplementary note 16) The communication device according to any one of Supplementary notes 12 to 15, in which the second control includes control of applying probabilistic shaping, the acquiring means is configured to acquire a signal-to-noise ratio in the communication channels, and the controlling means is configured to apply the probabilistic shaping in accordance with the signal-to-noise ratio if the quality of communication fails to satisfy the predetermined condition and if the optical quality value and the detection failure rate are within respective predetermined ranges.

(Supplementary note 17) The communication device according to any one of Supplementary notes 1 to 16, in which the quality of communication and the required quality of communication are each indicated by a throughput, the quality information includes a delay time in the communication line and a second error rate indicating an error rate held after an error correction of data transmitted via the communication line, and the estimating means is configured to estimate the quality of communication and determine the required quality of communication based on the delay time and the second error rate.

(Supplementary note 18) The communication device according to Supplementary note 17, in which the estimating means is configured to estimate the quality of communication and determine the required quality of communication by use of the delay time, the second error rate, and an estimation model for estimating a throughput.

(Supplementary note 19) The communication device according to Supplementary note 17 or 18, in which the communication line includes a first segment, a second segment, and the optical communication line, the acquiring means is configured to acquire the delay time and the second error rate in each of the first segment, the second segment, and the optical communication line, and the estimating means is configured to estimate the quality of communication and determine the required quality of communication based on the delay time and the second error rate in each of the first segment, the second segment, and the optical communication line.

(Supplementary note 20) The communication device according to Supplementary note 19, in which the estimating means is configured to determine the required quality of communication with the second error rate in the optical communication line regarded as being zero.

(Supplementary note 21) The communication device according to Supplementary note 19 or 20, in which the acquiring means is configured to determine the delay time and the second error rate in each of the first segment and the second segment based on a communication service provider that provides a communication line in the first segment and a communication service provider that provides a communication line in the second segment.

(Supplementary note 22) The communication device according to any one of Supplementary notes 19 to 21, in which the estimating means is configured to adjust the determined required quality of communication based on communication quality values required by the communication service providers that provide the communication lines in the first segment and the second segment.

(Supplementary note 23) The communication device according to any one of Supplementary notes 1 to 22, in which the estimating means is configured to adjust the determined required quality of communication based on a user profile between end user terminals.

(Supplementary note 24) A communication controlling method including: acquiring quality information of a communication line, the communication line extending from a first communication device to a second communication device and including an optical communication line; estimating a quality of communication of the second communication device and determining a required quality of communication of the second communication device based on the quality information; and performing control on communication channels in the optical communication line so that the quality of communication satisfies the required quality of communication.

(Supplementary note 25) A non-transitory computer-readable medium storing a program that causes a computer to execute: acquiring quality information of a communication line, the communication line extending from a first communication device to a second communication device and including an optical communication line; estimating a quality of communication of the second communication device and determining a required quality of communication of the second communication device based on the quality information; and performing control on communication channels in the optical communication line so that the quality of communication satisfies the required quality of communication.

(Supplementary note 26) An optical communication system including: a first optical transmitter device; a second optical transmitter device configured to communicate with the first optical transmitter device via an optical communication line; and a network monitoring device configured to communicate with the first optical transmitter device and the second optical transmitter device, in which the first optical transmitter device is configured to measure first quality information of a first communication line extending from a first communication device to the first optical transmitter device, the second optical transmitter device is configured to measure second quality information of the optical communication line and third quality information of a second communication line extending from the second optical transmitter device to a second communication device, and the network monitoring device is configured to acquire the first quality information from the first optical transmitter device and acquire the second quality information and the third quality information from the second optical transmitter device, estimate a quality of communication of the first communication device and determine a required quality of communication of the first communication device based on the first quality information, the second quality information, and the third quality information, and perform control on communication channels in the optical communication line via the first optical transmitter device so that the quality of communication satisfies the required quality of communication.

REFERENCE SIGNS LIST 1 communication device
2, 21, 61 acquiring unit
3, 22, 62 estimating unit
4, 23, 63 controlling unit
10, 40 terminal device
15, 35 circuit
20, 30, 50 optical transmitter device
25 optical communication line
60 network monitoring device
100, 200 optical communication system

What is claimed is:

1. A communication device comprising:
an acquiring unit configured to acquire quality information of a communication line, the communication line extending from a first communication device to a second communication device and including an optical communication line;
an estimating unit configured to estimate a quality of communication of the second communication device and determine a required quality of communication of the second communication device based on the quality information; and
a controlling unit configured to perform control on communication channels in the optical communication line so that the quality of communication satisfies the required quality of communication, wherein
the controlling unit is configured to execute at least one of first control or second control so that the quality of communication satisfies the required quality of communication, the first control including changing at least one of a communication channel configuration or a modulation scheme of the communication channels, the second control including changing an error correction process to be applied to the communication channels,
the acquiring unit is configured to acquire an optical quality value of the communication channels and a detection failure rate of detecting data transmitted via the communication channels, and
the controlling unit is configured to
execute the first control in accordance with the optical quality value and the detection failure rate if the quality of communication fails to satisfy a predetermined condition that is based on the required quality of communication,
execute, as the first control, at least one of changing the number of the communication channels, changing a guard band width between the communication channels, or changing the modulation scheme, and
change the number of the communication channels and the guard band width by changing a center frequency and a bandwidth of each of the communication channels.

2. A communication device comprising:
an acquiring unit configured to acquire quality information of a communication line, the communication line extending from a first communication device to a second communication device and including an optical communication line;
an estimating unit configured to estimate a quality of communication of the second communication device and determine a required quality of communication of the second communication device based on the quality information; and
a controlling unit configured to perform control on communication channels in the optical communication line so that the quality of communication satisfies the required quality of communication, wherein
the controlling unit is configured to execute at least one of first control or second control so that the quality of communication satisfies the required quality of communication, the first control including changing at least one of a communication channel configuration or a modulation scheme of the communication channels, the second control including changing an error correction process to be applied to the communication channels,
the acquiring unit is configured to acquire an optical quality value of the communication channels and a detection failure rate of detecting data transmitted via the communication channels, and
the controlling unit is configured to
execute the first control in accordance with the optical quality value and the detection failure rate if the quality of communication fails to satisfy a predetermined condition that is based on the required quality of communication,
execute, as the first control, at least one of changing the number of the communication channels, changing a guard band width between the communication channels, or changing the modulation scheme, and
execute at least one of control of increasing the number of the communication channels, control of narrowing the guard band width, or control of raising a multi-value level of the modulation scheme if the optical quality value is no lower than a first threshold and the detection failure rate is lower than a second threshold.

3. A communication device comprising:
an acquiring unit configured to acquire quality information of a communication line, the communication line extending from a first communication device to a second communication device and including an optical communication line;
an estimating unit configured to estimate a quality of communication of the second communication device and determine a required quality of communication of the second communication device based on the quality information; and
a controlling unit configured to perform control on communication channels in the optical communication line so that the quality of communication satisfies the required quality of communication, wherein
the controlling unit is configured to execute at least one of first control or second control so that the quality of communication satisfies the required quality of communication, the first control including changing at least one of a communication channel configuration or a modulation scheme of the communication channels, the second control including changing an error correction process to be applied to the communication channels,
the acquiring unit is configured to acquire an optical quality value of the communication channels and a detection failure rate of detecting data transmitted via the communication channels, and
the controlling unit is configured to
execute the first control in accordance with the optical quality value and the detection failure rate if the quality of communication fails to satisfy a predetermined condition that is based on the required quality of communication,
execute, as the first control, at least one of changing the number of the communication channels, changing a guard band width between the communication channels, or changing the modulation scheme, and
execute at least one of control of increasing the number of the communication channels, control of narrowing the guard band width, or control of raising a multi-value level of the modulation scheme if the optical quality value is lower than a first threshold and the detection failure rate is lower than a second threshold.

4. A communication device comprising:
an acquiring unit configured to acquire quality information of a communication line, the communication line extending from a first communication device to a second communication device and including an optical communication line;
an estimating unit configured to estimate a quality of communication of the second communication device and determine a required quality of communication of the second communication device based on the quality information; and
a controlling unit configured to perform control on communication channels in the optical communication line so that the quality of communication satisfies the required quality of communication, wherein
the controlling unit is configured to execute at least one of first control or second control so that the quality of communication satisfies the required quality of communication, the first control including changing at least one of a communication channel configuration or a modulation scheme of the communication channels, the second control including changing an error correction process to be applied to the communication channels,
the acquiring unit is configured to acquire an optical quality value of the communication channels and a detection failure rate of detecting data transmitted via the communication channels, and
the controlling unit is configured to
execute the first control in accordance with the optical quality value and the detection failure rate if the quality of communication fails to satisfy a predetermined condition that is based on the required quality of communication,
execute, as the first control, at least one of changing the number of the communication channels, changing a guard band width between the communication channels, or changing the modulation scheme, and
at least one of control of reducing the number of the communication channels, control of broadening the guard band width, or control of lowering a multi-value level of the modulation scheme if the optical quality value is lower than a first threshold and the detection failure rate is no lower than a second threshold.

5. A communication device comprising:
an acquiring unit configured to acquire quality information of a communication line, the communication line extending from a first communication device to a second communication device and including an optical communication line;
an estimating unit configured to estimate a quality of communication of the second communication device and determine a required quality of communication of the second communication device based on the quality information; and
a controlling unit configured to perform control on communication channels in the optical communication line so that the quality of communication satisfies the required quality of communication, wherein
the controlling unit is configured to execute at least one of first control or second control so that the quality of communication satisfies the required quality of communication, the first control including changing at least one of a communication channel configuration or a modulation scheme of the communication channels, the second control including changing an error correction process to be applied to the communication channels,
the acquiring unit is configured to acquire an optical quality value of the communication channels and a detection failure rate of detecting data transmitted via the communication channels, and
the controlling unit is configured to
  execute the first control in accordance with the optical quality value and the detection failure rate if the quality of communication fails to satisfy a predetermined condition that is based on the required quality of communication,
  execute, as the first control, at least one of changing the number of the communication channels, changing a guard band width between the communication channels, or changing the modulation scheme, and
  lower a transmitted power of the communication channels if the number of the communication channels is to be increased and if a total amount of transmitted power output to the optical communication line exceeds a value of power that can be output to the optical communication line.

6. A communication device comprising:
an acquiring unit configured to acquire quality information of a communication line, the communication line extending from a first communication device to a second communication device and including an optical communication line;
an estimating unit configured to estimate a quality of communication of the second communication device and determine a required quality of communication of the second communication device based on the quality information; and
a controlling unit configured to perform control on communication channels in the optical communication line so that the quality of communication satisfies the required quality of communication, wherein
the controlling unit is configured to execute at least one of first control or second control so that the quality of communication satisfies the required quality of communication, the first control including changing at least one of a communication channel configuration or a modulation scheme of the communication channels, the second control including changing an error correction process to be applied to the communication channels,
the acquiring unit is configured to acquire an optical quality value of the communication channels and a detection failure rate of detecting data transmitted via the communication channels,
the controlling unit is configured to
  execute the first control in accordance with the optical quality value and the detection failure rate if the quality of communication fails to satisfy a predetermined condition that is based on the required quality of communication, and
  execute, as the first control, at least one of changing the number of the communication channels, changing a guard band width between the communication channels, or changing the modulation scheme,
the acquiring unit is configured to acquire burst error information pertaining to a burst error in the optical communication line, and
the controlling unit is configured to execute at least one of control of reducing the number of the communication channels, control of broadening the guard band width, or control of lowering a multi-value level of the modulation scheme if the burst error information exceeds a threshold.

7. The communication device according to claim 6, wherein the burst error information includes a rate of occurrence of the burst error and a duration of the burst error.

8. A communication device comprising:
an acquiring unit configured to acquire quality information of a communication line, the communication line extending from a first communication device to a second communication device and including an optical communication line;
an estimating unit configured to estimate a quality of communication of the second communication device and determine a required quality of communication of the second communication device based on the quality information; and
a controlling unit configured to perform control on communication channels in the optical communication line so that the quality of communication satisfies the required quality of communication, wherein
the controlling unit is configured to execute at least one of first control or second control so that the quality of communication satisfies the required quality of communication, the first control including changing at least one of a communication channel configuration or a modulation scheme of the communication channels, the second control including changing an error correction process to be applied to the communication channels,
the acquiring unit is configured to acquire an optical quality value of the communication channels and a detection failure rate of detecting data transmitted via the communication channels,
the controlling unit is configured to execute the first control in accordance with the optical quality value and the detection failure rate if the quality of communication fails to satisfy a predetermined condition that is based on the required quality of communication,
the acquiring unit is configured to further acquire a first error rate indicating an error rate held before an error correction of the data, and
the controlling unit is configured to execute the second control in accordance with the first error rate if the quality of communication fails to satisfy the predetermined condition and if the optical quality value and the detection failure rate are within respective predetermined ranges.

9. The communication device according to claim 8, wherein the controlling unit is configured to, as the second control, change a parity length used in the error correction.

10. The communication device according to claim 9, wherein the controlling unit is configured to increase the parity length if the first error rate is no lower than a threshold.

11. The communication device according to claim 9, wherein the controlling unit is configured to reduce the parity length if the first error rate is lower than a threshold.

12. The communication device according to claim 8, wherein
the second control includes control of applying probabilistic shaping,
the acquiring unit is configured to acquire a signal-to-noise ratio in the communication channels, and
the controlling unit is configured to apply the probabilistic shaping in accordance with the signal-to-noise ratio if the quality of communication fails to satisfy the predetermined condition and if the optical quality value and the detection failure rate are within respective predetermined ranges.

13. A communication device comprising:
an acquiring unit configured to acquire quality information of a communication line, the communication line extending from a first communication device to a second communication device and including an optical communication line;
an estimating unit configured to estimate a quality of communication of the second communication device and determine a required quality of communication of the second communication device based on the quality information; and
a controlling unit configured to perform control on communication channels in the optical communication line so that the quality of communication satisfies the required quality of communication, wherein
the quality of communication and the required quality of communication are each indicated by a throughput,
the quality information includes a delay time in the communication line and a second error rate indicating an error rate held after an error correction of data transmitted via the communication line, and
the estimating unit is configured to estimate the quality of communication and determine the required quality of communication based on the delay time and the second error rate.

14. The communication device according to claim 13, wherein the estimating unit is configured to estimate the quality of communication and determine the required quality of communication by use of the delay time, the second error rate, and an estimation model for estimating a throughput.

15. A communication controlling method comprising:
acquiring quality information of a communication line, the communication line extending from a first communication device to a second communication device and including an optical communication line;
estimating a quality of communication of the second communication device and determining a required quality of communication of the second communication device based on the quality information;
performing control on communication channels in the optical communication line so that the quality of communication satisfies the required quality of communication;
executing at least one of first control or second control so that the quality of communication satisfies the required quality of communication, the first control including changing at least one of a communication channel configuration or a modulation scheme of the communication channels, the second control including changing an error correction process to be applied to the communication channels;
acquiring an optical quality value of the communication channels and a detection failure rate of detecting data transmitted via the communication channels;
executing the first control in accordance with the optical quality value and the detection failure rate if the quality of communication fails to satisfy a predetermined condition that is based on the required quality of communication;
executing, as the first control, at least one of changing the number of the communication channels, changing a guard band width between the communication channels, or changing the modulation scheme; and
changing the number of the communication channels and the guard band width by changing a center frequency and a bandwidth of each of the communication channels.

16. A non-transitory computer-readable medium storing a program that causes a computer to execute:
acquiring quality information of a communication line, the communication line extending from a first communication device to a second communication device and including an optical communication line;
estimating a quality of communication of the second communication device and determining a required quality of communication of the second communication device based on the quality information;
performing control on communication channels in the optical communication line so that the quality of communication satisfies the required quality of communication;
executing at least one of first control or second control so that the quality of communication satisfies the required quality of communication, the first control including changing at least one of a communication channel configuration or a modulation scheme of the communication channels, the second control including changing an error correction process to be applied to the communication channels;
acquiring an optical quality value of the communication channels and a detection failure rate of detecting data transmitted via the communication channels;
executing the first control in accordance with the optical quality value and the detection failure rate if the quality of communication fails to satisfy a predetermined condition that is based on the required quality of communication;
executing, as the first control, at least one of changing the number of the communication channels, changing a guard band width between the communication channels, or changing the modulation scheme; and
changing the number of the communication channels and the guard band width by changing a center frequency and a bandwidth of each of the communication channels.

* * * * *